US009014713B1

(12) United States Patent
Shaw

(10) Patent No.: US 9,014,713 B1
(45) Date of Patent: Apr. 21, 2015

(54) METHOD FOR PROVIDING A PERSONALIZED SHOPPING CATALOG

(75) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1016 days.

(21) Appl. No.: 11/893,654

(22) Filed: Aug. 17, 2007

Related U.S. Application Data

(60) Provisional application No. 60/953,956, filed on Aug. 3, 2007.

(51) Int. Cl.
*H04W 24/00* (2009.01)
*G06Q 30/02* (2012.01)

(52) U.S. Cl.
CPC .................................. *G06Q 30/0267* (2013.01)

(58) Field of Classification Search
CPC .......... G06Q 30/0601; G06Q 30/0621; G06Q 30/0631; G06Q 30/0639
USPC ............. 455/404.2, 456.1–457, 412.1, 412.2, 455/414.1–414.4; 705/26.1, 26.5, 26.7, 705/26.8, 26.9
See application file for complete search history.

(56) References Cited

U.S. PATENT DOCUMENTS

| | | | |
|---|---|---|---|
| 6,091,956 A * | 7/2000 | Hollenberg | 455/456.5 |
| 6,386,450 B1 * | 5/2002 | Ogasawara | 235/383 |
| 7,565,157 B1 * | 7/2009 | Ortega et al. | 455/456.2 |
| 7,720,723 B2 * | 5/2010 | Dicker et al. | 705/26.8 |
| 2004/0078209 A1 * | 4/2004 | Thomson | 705/1 |
| 2005/0091118 A1 * | 4/2005 | Fano | 705/26 |
| 2005/0144091 A1 * | 6/2005 | Harper et al. | 705/26 |
| 2006/0079247 A1 * | 4/2006 | Ritter | 455/456.1 |
| 2007/0060129 A1 | 3/2007 | Ramer et al. | 455/439 |
| 2007/0061245 A1 | 3/2007 | Ramer et al. | 705/37 |
| 2007/0061300 A1 | 3/2007 | Ramer et al. | 707/3 |
| 2007/0061301 A1 | 3/2007 | Ramer et al. | 707/3 |
| 2007/0061302 A1 | 3/2007 | Ramer et al. | 707/3 |
| 2007/0073717 A1 | 3/2007 | Ramer et al. | 707/10 |
| 2007/0073722 A1 | 3/2007 | Ramer et al. | 707/10 |
| 2008/0005055 A1 * | 1/2008 | Horvitz | 706/62 |
| 2009/0282030 A1 * | 11/2009 | Abbott et al. | 707/5 |

* cited by examiner

*Primary Examiner* — Wayne Cai
(74) *Attorney, Agent, or Firm* — Hartman & Citrin LLC

(57) ABSTRACT

An embodiment includes a method. In one example, the method includes, but is not limited to, determining a location of a mobile device; and transmitting a signal to the mobile device, wherein the signal includes information related to a product sold at a store. In addition to the foregoing, other aspects are described in the claims, drawings, and text forming a part of the present disclosure.

20 Claims, 21 Drawing Sheets

METHOD FOR PROVIDING A PERSONALIZED SHOPPING CATALOG

CROSS REFERENCE TO RELATED APPLICATIONS

This application claims priority to U.S. Patent Application No. 60/953,956, filed on Aug. 3, 2007, the contents of which are herein incorporated by reference in their entirety.

BACKGROUND

A large number of people today own mobile devices, and some regard their mobile device as a necessity. It is common for people to carry their device everywhere they go and leave their devices on 24 hours a day. This offers service providers a unique opportunity to sell services and products to individuals that will always be connected to a network. This is evident in the fact that as technology advances, so has the number of products and services that have been incorporated into mobile devices and offered to customers for a price. An interesting trend is to utilize technology that pinpoints the location of mobile devices within the network and use that information to provide consumers with services that take the location of the person into account.

Currently, the technological advances in this area have been directed towards targeted advertising and targeted search results. While these services are important, these are just a few of the services that utilize data such as a customer's profile and their location.

SUMMARY

In one example embodiment of a personalized catalog, a method includes, but is not limited to, determining a location of a mobile device; accessing a user profile of a user associated with the mobile device; identifying a store in accordance with the location of the mobile device and the profile of the user; accessing a database of store information, and selecting, in accordance with the user profile, a product sold at the store; and transmitting a signal to the mobile device, wherein the signal includes information related to the selected product.

It can be appreciated by one of skill in the art that one or more various aspects of the disclosure may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer.

In one example embodiment of a personalized catalog, a method includes, but is not limited to, transmitting, from a mobile device, a signal that can be used to locate the mobile device; receiving a signal that includes information about a plurality of products sold by a plurality of stores; determining a distance between the mobile device and each store of the plurality of stores; and displaying the information about the plurality of products in accordance with the distance between the mobile device and each store of the plurality of stores.

It can be appreciated by one of skill in the art that one or more various aspects of the disclosure may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer.

In another example embodiment of a personalized catalog, a method includes, but is not limited to, transmitting, from a mobile device, information that can be used to locate the mobile device; receiving, from a remote device, a signal including information related to a selected product offered by a store, the selection of the product based in part on a user profile of a user associated with the mobile device, and a location of the mobile device; and displaying the information related to the product on a display of the mobile device.

It can be appreciated by one of skill in the art that one or more various aspects of the disclosure may include but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION OF ILLUSTRATIVE EMBODIMENTS

Figure 1:
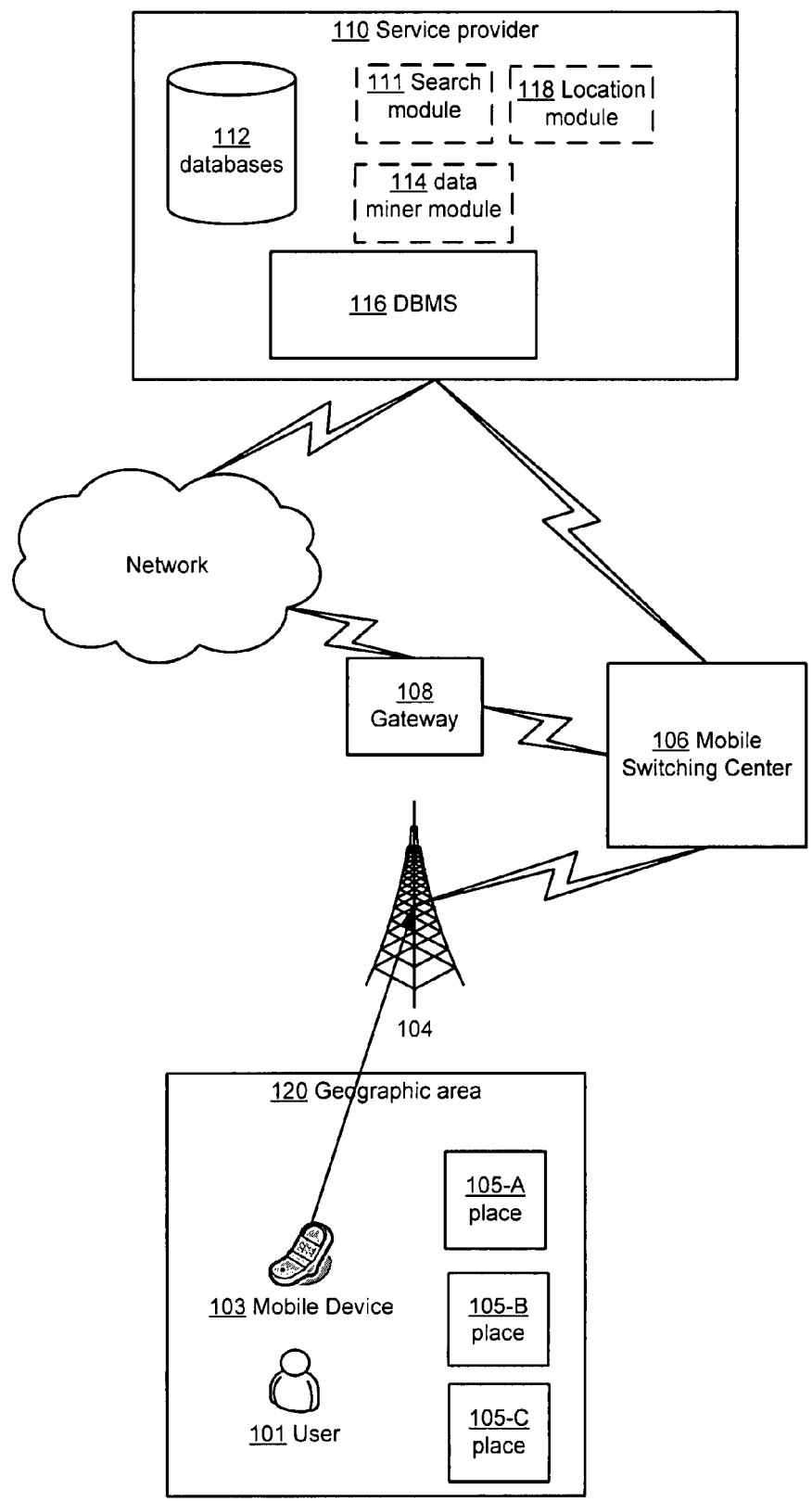
FIG. 1 depicts an example operating environment wherein operational procedures of the present disclosure may be practiced.

The example system of FIG. 1 is described in more detail below in relation to the operational procedures described herein. One skilled in the art will note that the example elements depicted in FIG. 1 are provided to depict an operational context to practice aspects of the present disclosure. Thus, the example operational context is to be treated as illustrative only and in no way limit the scope of the claims.

FIG. 1 depicts an example operating environment wherein operational procedures of the present disclosure may be practiced. FIG. 1 depicts a service provider 110 that, in one embodiment, can own, or use, electronic equipment to provide services that include, but are not limited to, wireless telephone services, SMS messaging services, targeted advertisements, and services such as those taught by the present disclosure. In at least one additional embodiment, the service provider 110 can be a web presence that does not maintain a network, but instead leverages a network operated by a wireless carrier, or Internet Service Provider. FIG. 1 depicts a user 101 that may own, or have access to, a mobile device 103. As one skilled in the art will appreciate, while one device 103 is depicted, the system can be configured to service multiple devices. One skilled in the art will also recognize that a device may include, but is not limited to, a cellular phone, a pocket pc, a personal digital assistant, or any device that communicates via a mobile communications protocol, such as the advanced mobile phone system, code division multiple access, time division multiple access, global system for mobile communications, etc. The mobile device 103 may be in wireless communication with a base station 104. Generally, the base station 104 includes any equipment necessary for transmitting and receiving radio signals from mobile device 103, and the base station 104 may be operably coupled to a base station controller (not shown) that controls the base station 104.

The exemplarily system depicted in FIG. 1 also includes a mobile switching center 106 that can be operably coupled to a base station controller (not shown). The mobile switching center 106 can provide services, such as voice, data, fax, and short message services to the mobile devices within the area that it serves. The mobile switching center 106 can be coupled to a gateway 108 that can act as an interface between the mobile network and a packet based network, such as the Internet.

In addition to being connected to a gateway 108, the mobile switching center 106 can be connected to a service provider 110. As depicted in FIG. 1, a service provider 110 may include a combination of hardware and/or software that includes, but is not limited to, one or more databases of information 112, a database management system 116 operably coupled to the one or more databases 112, a location module 118, a data mining module 114, and a search module 111. Generally, and described more fully below, the search module 111, the location module 118, and the data mining module 114 of the present disclosure may include, but are not limited to, one or more modules, that can be any combination of hardware, software, and/or firmware programmed to effect aspects of the present disclosure. One skilled in the art will also note that modules 111, 114, and 118 are separately described for clarity purposes and the disclosure is not limited to embodiments where separate processes, circuitry, or a combination of circuitry and processes, are configured to effect the described aspects of the disclosure.

The database management program 116 can include one or more software programs designed to manage one or more databases of information 112. In some embodiments, these databases 112 can include user accounts associated with a plurality of users such as user 101, and information related to the plurality of stores 105-A through 105-C located in a geographical area 120. In some embodiments, the database(s) 112 may comprise a relational database, an object oriented database, or a database that incorporates features of either type.

The following are a series of flowcharts depicting implementations of processes. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. Those skilled in the art will also note that some of the example operational procedures depicted are illustrated in dashed lines which is indicative of the fact that they are considered optional. In addition, those skilled in the art will further appreciate that the style of presentation used herein also lends itself well to modular and/or object-oriented program design paradigms.

Figure 2:
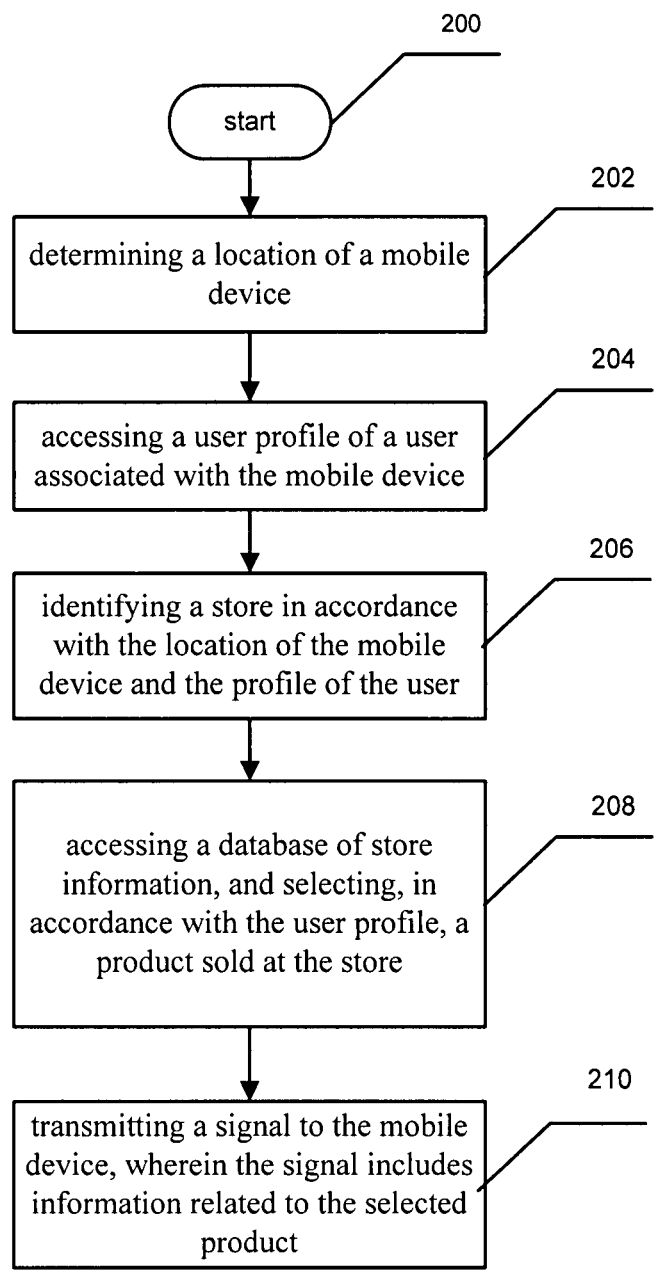
FIG. 2 illustrates an exemplarily operational flow chart representing example operations related to techniques for sending product catalogs to users.

Referring now to FIG. 2, it illustrates an operational flow chart that depicts techniques of the present disclosure. Operation 200 begins the operational process, and operation 202 illustrates determining a location of a mobile device. For example, in systems that perform operations similar to operation 202, a location module 118 can be configured to locate a mobile device 103 within a network. For example, in one embodiment, the location can be determined by comparing data from multiple base stations 104. In this example, a mobile device 103 can be connected to a mobile network and can transmit/receive data at predetermined intervals allowing the mobile switching center 106 to find it if a telephone call needs to be sent to the device. The service provider 110 can accomplish this by analyzing data such as the signal strength of the return message sent by a mobile device 103, the time difference between when a signal was sent from a tower, and when the tower receives a response from the mobile device 103, etc. In another example, the position of a mobile device 103 can be determined by using a technique that triangulates the position of the mobile device 103 by determining, at multiple towers, what direction mobile device signals were received from, and figuring out where the intersection between the towers is. In another example embodiment, the device 103 may include a GPS or an A-GPS subsystem. In embodiments that include GPS, or A-GPS, a network of satellites may capture position data for the mobile device 103 and pinpoint a device's location. In yet another embodiment, the mobile device 103 can include a short wave radio transceiver such as an RFID subsystem. In these embodiments, the RFID subsystem can send signals to RFID transmitters located at a plurality of places 105-A through 105-C that identify the mobile device, and the place(s) can forward that information to the location module 118 via a network connection.

Operation 204 illustrates accessing a user profile of a user associated with the mobile device. For example, and in addition to the previous example, a profile of the user 101 associated with the mobile device 103 can be accessed via the database manager 116. In at least one embodiment of the present disclosure, a user 101 can be associated with a mobile device 103 if they have an account with the service provider 110. For example, a user 101 may subscribe to one or more services offered by a service provider 110, or sign up with the service provider 110. Generally, if the service provider 110 offers cellular services when a user 101 subscribes to a service, the service provider 110 will create a profile for the user 101 that includes an identifier linking, i.e., associating, the user's profile to an account for a mobile device 103. If the mobile device 103 is a mobile phone for example, the service provider 110 can assign a phone number to the phone and associate that phone number with the user 101. In another embodiment, the user 101 may already have a mobile device 103, and provide the phone number of their device to the service provider 110 to associate the mobile device 103 with the user 101. The information stored in the user's profile may include, but is not limited to, information explicitly given by a user 101, i.e., account information like a social security number, a drivers license number, a home address, a job description, group membership information, i.e., whether they are members of a family group, a work group, and/or members of a group based on their traits, i.e., single, mid-20s, car owner, home owner, etc. In some embodiments, the user profile may contain information such as what products or services the user 101 has purchased in the past from the service provider 110, or from a website affiliated with the service provider 110. Furthermore, in some embodiments, purchasing information for the user 101 can be obtained from places 105-A through 105-C that may agree to provide the service provider 110 with information such as products and/or services the user has obtained from them.

Each product, or service, may have metadata associated with it that identifies the product, or service. The database management system 116 can create relationships between products, and/or services, based on common attributes. Each user 101 can also have a user profile that identifies what products, or services, they have purchased in the past or products they are interested in. A data miner 114 can infer that a user 101 that has purchased one product, or service, will probably have similar tastes as a person that bought the same product on a separate occasion. The information indicating what products, or services, a user 101 purchased can be obtained in one embodiment by monitoring the internet usage of the user 101. A user 101 may access the Internet via their mobile device's Internet browser to view, or purchase, products and services online. A copy of the web pages viewed by the user 101, or the url of the web pages may be recorded by, for example, the mobile device 103, and/or a mobile switching center 106. This information can be transmitted to the service provider 110 and associated with the profile of the user 101. In another embodiment, the service provider 110 may affiliate with places 105-A through 105-C. The places 105-A through 105-C, i.e., stores in this example, may provide information about products, or services, purchased by the user 101 to the service provider 110. In another example embodiment, the service provider 110 may send advertisements to the user 101 that display products that were purchased by users with similar tastes, and monitor the user's response to the advertisements. In this example, the service provider 110 may allow for the user 101 to indicate whether they already own the product, or ask them to rate the product. The service provider 110 may provide the user 101 with some incentive to provide feedback, such as by giving the user 101 coupons that can be used at stores. In addition to collecting information about the user 101, the system may collect information from any other user of the system.

Operation 206 illustrates identifying a store in accordance with the location of the mobile device and the profile of the user. For example, and in addition to the previous example, the search module 111 can perform a search for stores, that the user 101 is interested in by using the location of the mobile device 103 and the user profile of the user 101. In some embodiments, this can be accomplished by querying a database 112 of store information to find a store of interest to the user 101 in the user's general location (for example geographic area 120). In some embodiments of the present disclosure, the places 105-A through 105-C for example, in a geographical area 120 may have been previously identified by the service provider 110 and information about them could have been collected. This information can be, for example, stored in the database of information 112, and can include the addresses of the stores 105-A through 105-C, and the store's brand, i.e., metadata that identifies what type of products or services the store offers, or metadata that defines a store type. For example, a database entry for a store such as Best Buy® may include the street address of all the Best Buy® stores in the region, i.e., an area such as geographic area 120, and the brand that Best Buy® belongs to, i.e., metadata that identifies it as a retailer of consumer electronics. In another example, an entry for a store such as Bed Bath and Beyond® may include metadata that identifies it as a retailer of high quality domestic merchandise. The information that identifies the store's brand can be used to determine whether a user 101 would find the store interesting.

A specific example of operation 206 may include a user 101 that has made numerous consumer electronics purchases in the past year, such as, a cellular phone, ten videogames, and a DVD player, but has not purchased any domestic products. This user 101 can execute the catalog generating feature of their mobile device 103, and the search module 111 can access the user profile of the user in order to formulate a query for stores matching the user's profile in the user's area, e.g., if the user 101 has a profile with attributes that identify them as a consumer electronics enthusiast, a store (store 105-A for example) that sells consumer electronics can be identified.

Continuing with the example, operation 208 of FIG. 2 illustrates accessing a database of store information, and selecting, in accordance with the user profile, a product sold at the store. For example, and in addition to the previous example, once the search module 111 has identified one or more stores that may be of interest to the user 101 (stores 105-A and 105-B for example), the search module 111 can access a database 112 that includes product or service information about the store(s) and select one or more products that the user 101 may want based on their profile. In some embodiments, the database 112 may include information identifying the products that this particular store, i.e., the physical store in close proximity to the user 101, currently sells and has in stock.

In embodiments of the present disclosure, the search module 111 may select products using an algorithm that, for example, can identify products that are associated with attributes that are desirable to the user 101, and/or identify products that the user 101 has purchased, and/or identify products purchased by other users that purchased the same, or similar, products as the user 101, and/or eliminate products the user 101 has identified as products they are not interested in, or products that they already own. A specific example may include a search module 111 that uses location information provided by a location module 118 in a query to determine that a user 101 is interested in products sold by a Best Buy® (place 105-A for example). The search module 111 can query a database 112 (via the database management system 116) to determine the current inventory of the Best Buy® (105-A) located near the user 101. In this example, the user 101 may have previously purchased a dvd player, and the search module 111 may retrieve a list of dvds, or dvd player accessories (because the user 101 has been identified as one that owns a dvd player, and the dvd player is linked to other products like dvds and dvd player accessories). In this example, the list of dvds may include movies that have attributes similar to those of prior movies the user 101 has purchased, i.e., if the user purchase action movies, the search engine 111 can be configured to find action movies the user 101 does not own. More specifically, in some embodiments, the search module 111 may identify a plurality of stores in the general area 120 of the user 101, and for each store it may select products that may be of interest to the user 101.

Operation 210 of FIG. 2 illustrates transmitting a signal to the mobile device, wherein the signal includes information related to the selected product. For example, and in addition to the previous example, the service provider 110 can transmit a signal indicative of the product(s) selected by the search module 111 in operation 208, to a mobile device 103.

Figure 3:
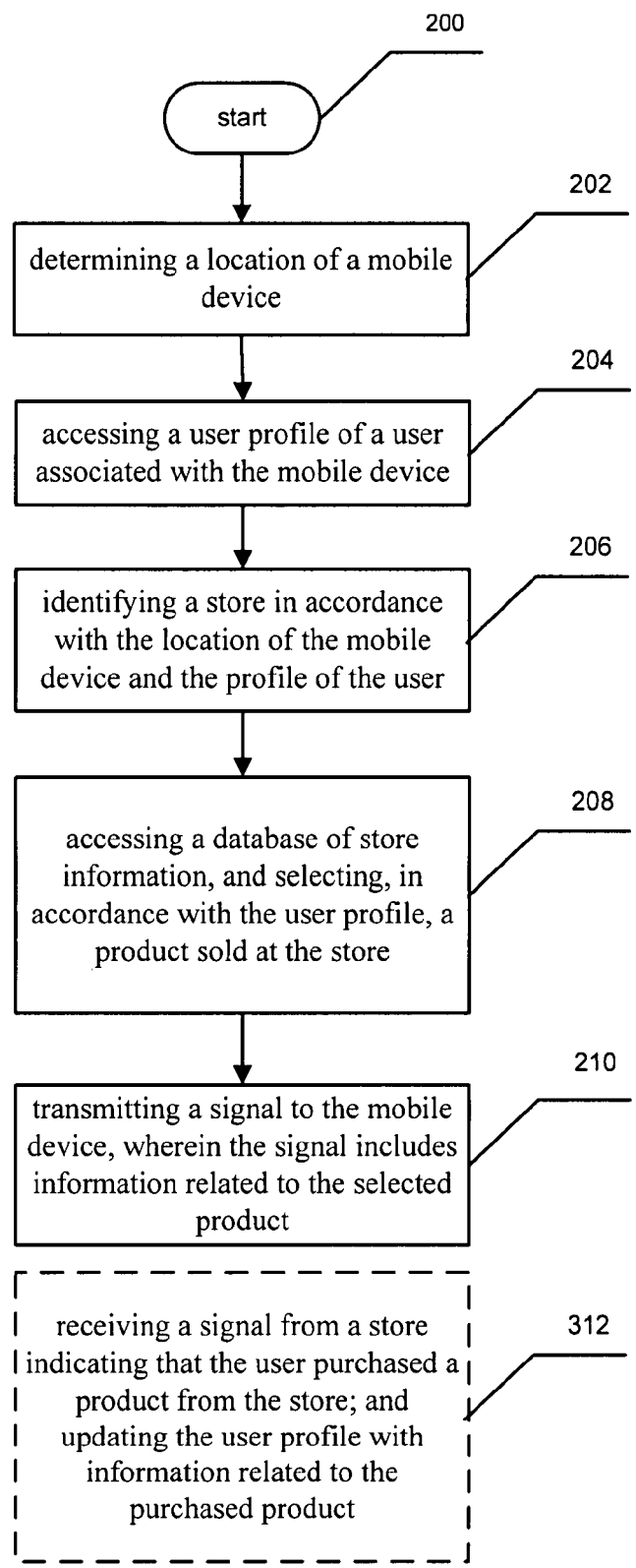
FIG. 3 illustrates an alternative embodiment of the operational flow 200 of FIG. 2.

Referring now to FIG. 3, it illustrates an embodiment including optional operation 312 that discloses receiving a signal from a store indicating that the user purchased a product from the store; and updating the user profile with information related to the purchased product. Similar to that described above, in some example embodiments of the present disclosure, a service provider 110, can receive a signal, i.e., one or more packets of information, from a store such as store 105-A. The signal in this example, can include information indicating that the user 101 purchased a product at store 105-A. In some embodiments, this product could be the product previously transmitted to the user 101 in a catalog. In these embodiments, the service provider 110 can use this information to update the user profile associated with the user 101 to reflect the purchase. In the instance that the product was transmitted in a catalog, the purchase can be used to indicate that the system correctly predicted that the product was of interest to the user 101. This information can be processed and used for subsequent searches.

Figure 4:
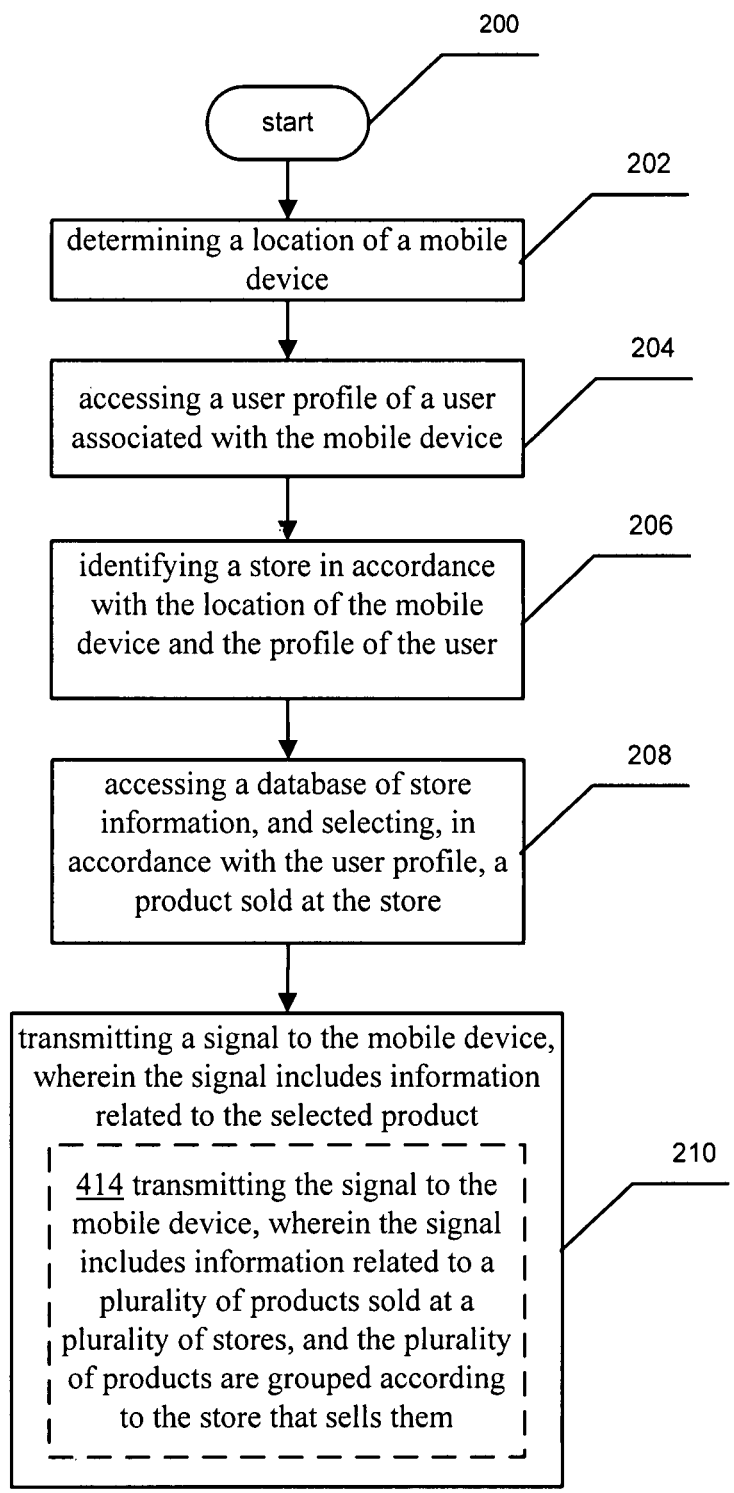
FIG. 4 illustrates an alternative embodiment of the operational flow 200 of FIG. 2.

Referring now to FIG. 4, it depicts an alternative embodiment of FIG. 2 including the additional operation 414 that illustrates transmitting the signal to the mobile device, wherein the signal includes information related to a plurality of products sold at a plurality of stores, and the plurality of products are grouped according to the store that sells them. Similar to that described above, in some embodiments a search engine 111 may identify a plurality of stores and the signal transmitted to the mobile device 103 can include information about products sold by multiple stores. In this example embodiment, the signal that includes the products can be transmitted, and formatted, in a way that causes a mobile device 103 to group products according to the store where they are sold. In some embodiments, the search module 111 can be configured to identify one or more stores in the general area 120 of the user 101 using a variety of techniques. For example, a user 101 can enter a geographical area 120, e.g., a mall, a strip mall, a shopping district, or any other place that has one or more businesses that offer products, or services, and they can execute a program on their mobile device 103 that enables them to receive a catalog of goods and/or services. In one embodiment, if a user 101 with diverse interests executes the catalog feature of their mobile device 103, the search module 111 can be configured to identify a plurality of stores that sell products reflecting this diversity. For example, if the user 101 were in a mall, the search module 111 can identify clothing stores, multiple consumer electronic stores, etc., in a query that takes into account the user's diverse interests. In this example, the catalog displayed by the mobile device 103 can be formatted in a way that groups the products sold at the same store together under a common heading.

Figure 5:
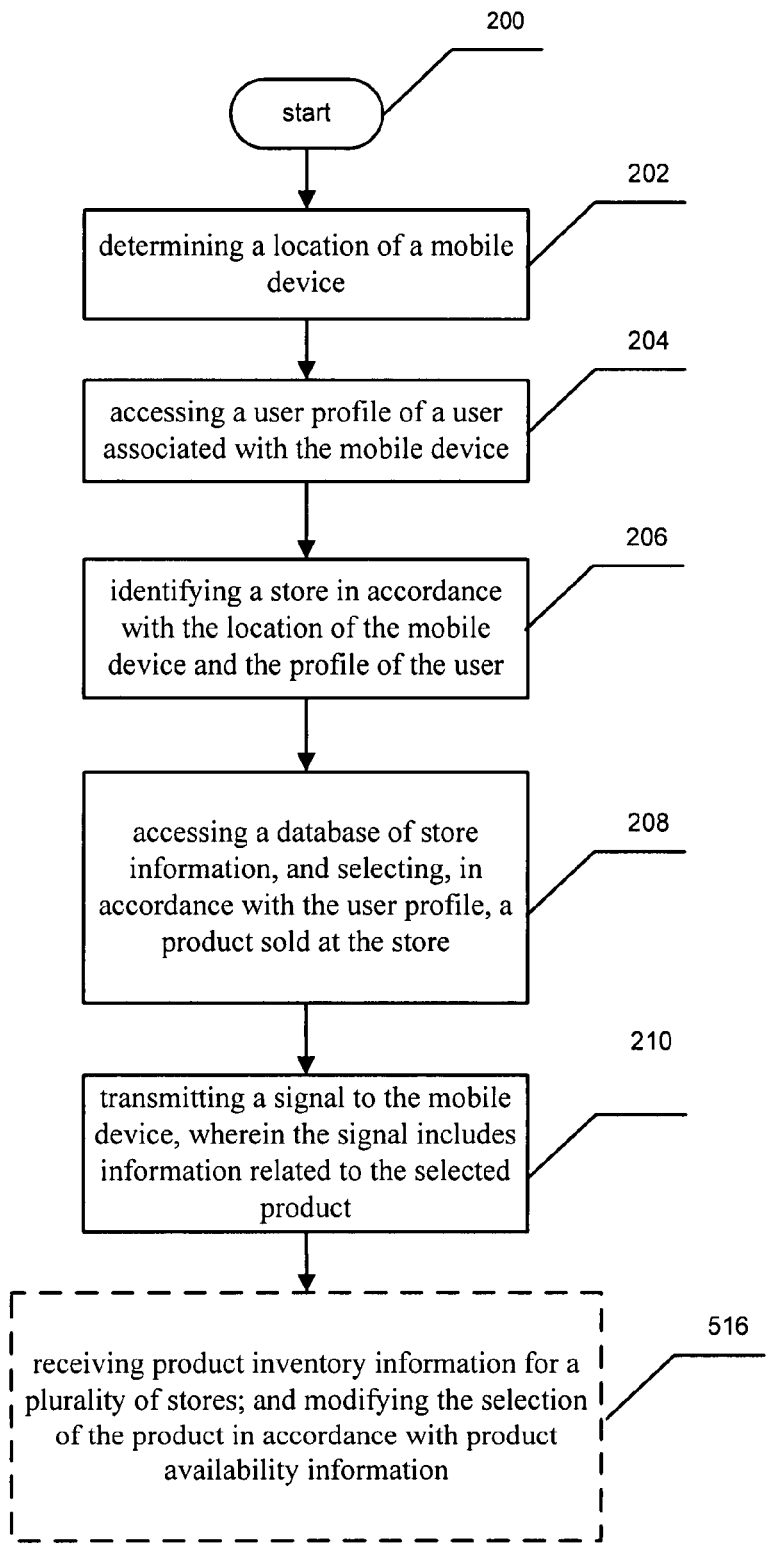
FIG. 5 illustrates an alternative embodiment of the operational flow 200 of FIG. 2.

Referring now to FIG. 5, it depicts an example embodiment of FIG. 2 that includes optional operation 516 that illustrates receiving product inventory information for a plurality of stores; and modifying the selection of the product in accordance with product availability information. For example, in at least one embodiment, the selection of products from a specific store to transmit in a catalog can be modified based on the inventory information for the store closest to the user 101. In some embodiments, the store may transmit inventory and product information related to the products to the service provider 110 at predetermined intervals such as once a day, once a week, or any other interval. In other embodiments of the present disclosure, the service provider 110 can include a web crawler program that is operable to access websites associated with stores and perform queries to determine what products are sold at what specific store locations, and whether the products are in stock, and/or the quantity. This information can be leveraged by the search module to add, remove, promote, demote, products, or services, based on whether they are in stock, based on the quantity of the product, or whether the service can be performed timely. For example, if the search module 111 identifies 3 stores of interest to the user 101, for example, a consumer electronics store, a clothing stores, and a pizzeria, the search module 111 may compile a list of products, or services, that the stores offer, and remove products that are out of stock, promote products that are on sale, or promote products that have limited quantity within the catalog so that the user 101 is more likely to look at them. In this specific example, the pizzeria may be promoted based on whether there is a table available for the user 101, or the clothing store can be promoted if a shirt the user 101 wants is available, but in limited quantity.

Figure 6:
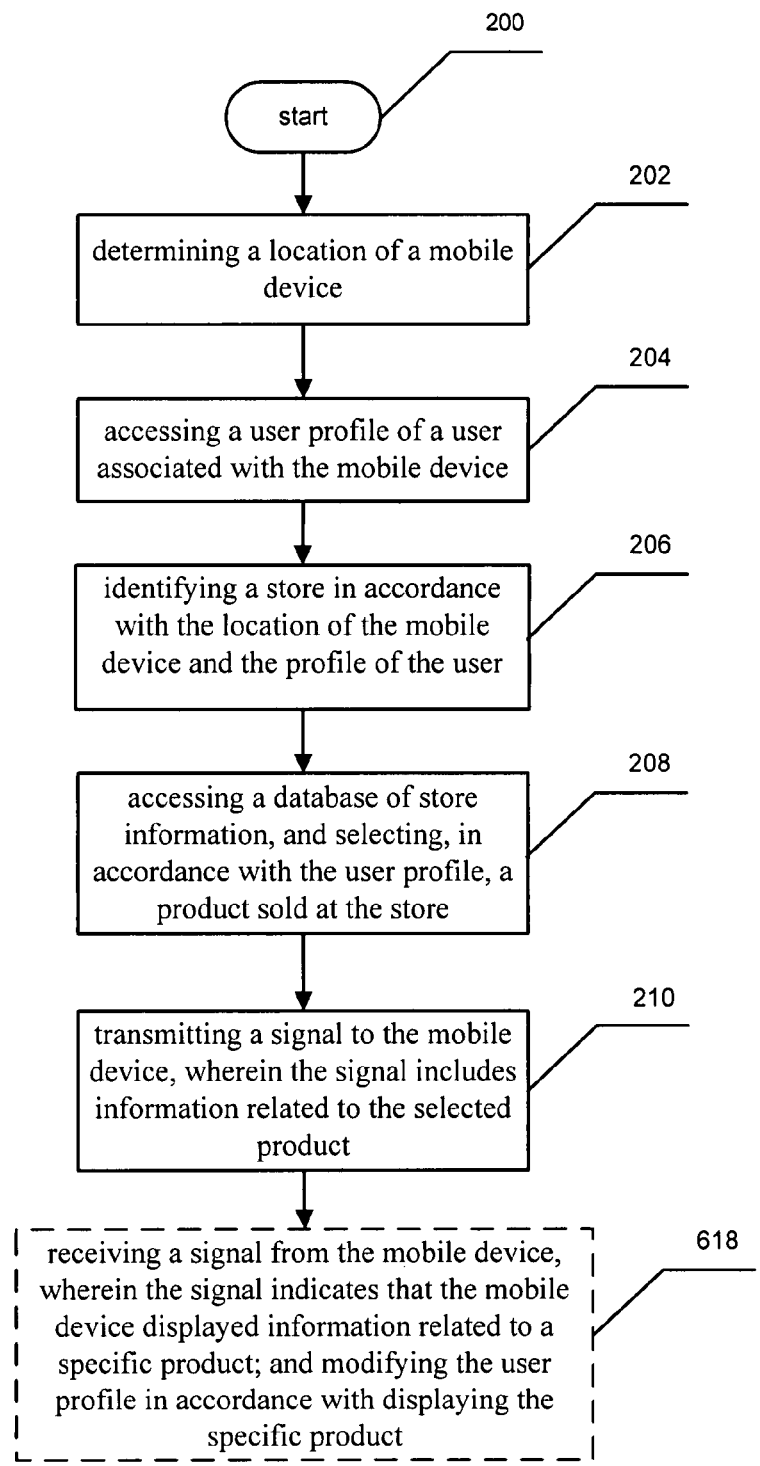
FIG. 6 illustrates an alternative embodiment of the operational flow 200 of FIG. 2.

Referring now to FIG. 6, it depicts optional operation 618 that shows receiving a signal from the mobile device, wherein the signal indicates that the mobile device displayed information related to a specific product; and modifying the user profile in accordance with displaying the specific product. For example, the mobile device 103 can be configured to track the key strokes of the user 101 to determine whether the user 101 has viewed information related to a product send to the mobile device 103. In this embodiment, the mobile device 103 can be configured to transmit data to the service provider 110 if the user's input indicates that the user 101 viewed information for a specific product. For example, the catalog may list the products according to price, availability, alphabetically, or according to a rating system that identifies what product(s) the user 101 is interested in. If the user 101 scrolls through the list and selects a product, i.e., clicks on the title, the mobile device 103 may display more information about the product. In this case, the mobile device 103 may record that the user 101 wanted more information for this product, and the data miner 114 may rank that product, or those similar to it, higher in subsequent searches.

Figure 7:
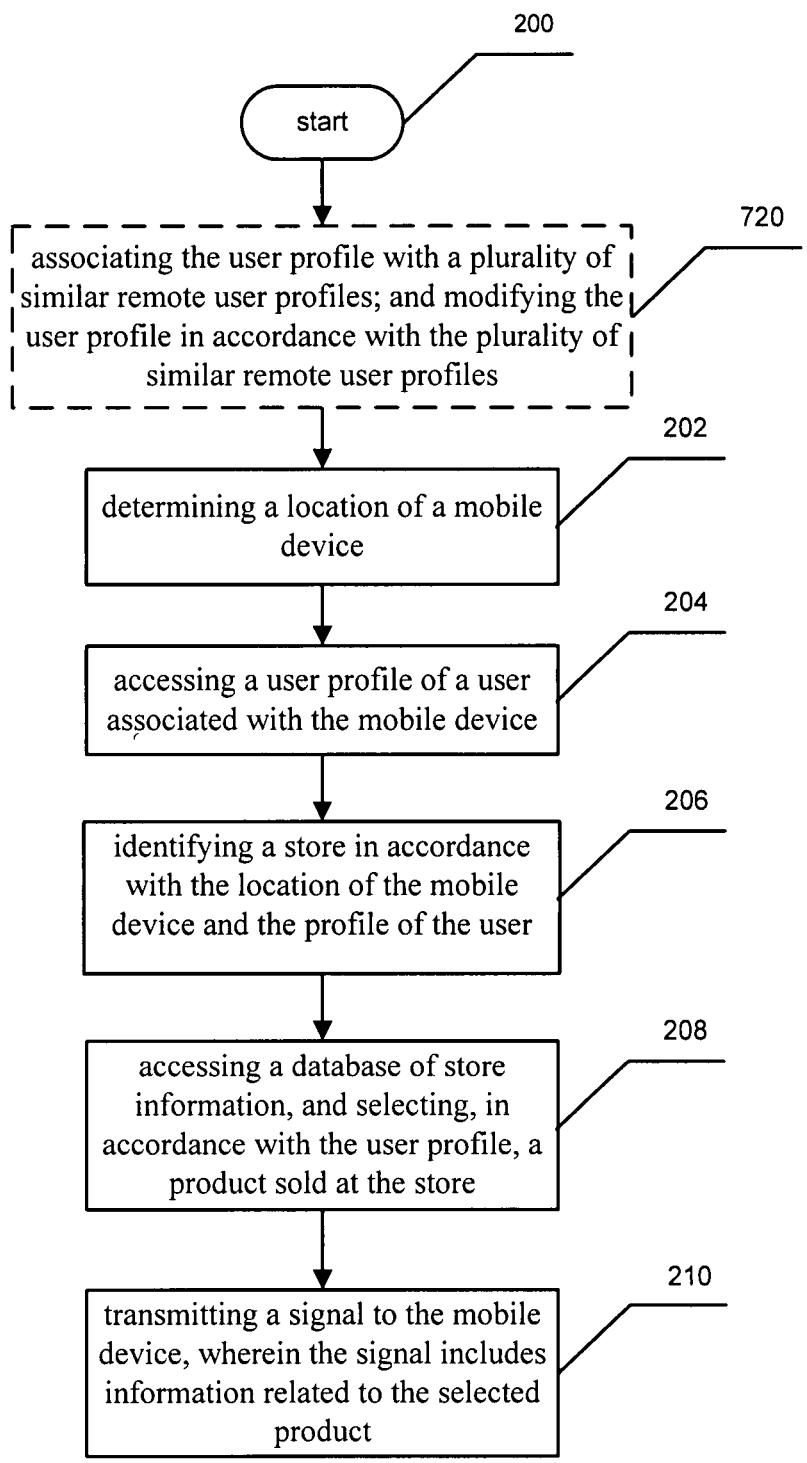
FIG. 7 illustrates an alternative embodiment of the operational flow 200 of FIG. 2.

Referring now to FIG. 7, it depicts an example embodiment of FIG. 2 that includes optional operation 720 that illustrates associating the user profile with a plurality of similar remote user profiles; and modifying the user profile in accordance with the plurality of similar remote user profiles. In some example embodiments, and similar to that described above, the data miner 114 can be configured make inferences about a user 101 and relate the user 101 to other users that have purchased similar products. The purchasing habits of one user may be used to suggest products or services to another user and vice versa. This information in some embodiments can be leveraged by the service provider 110 to predict what a particular user is interested in based on information obtained from similar users.

Figure 8:
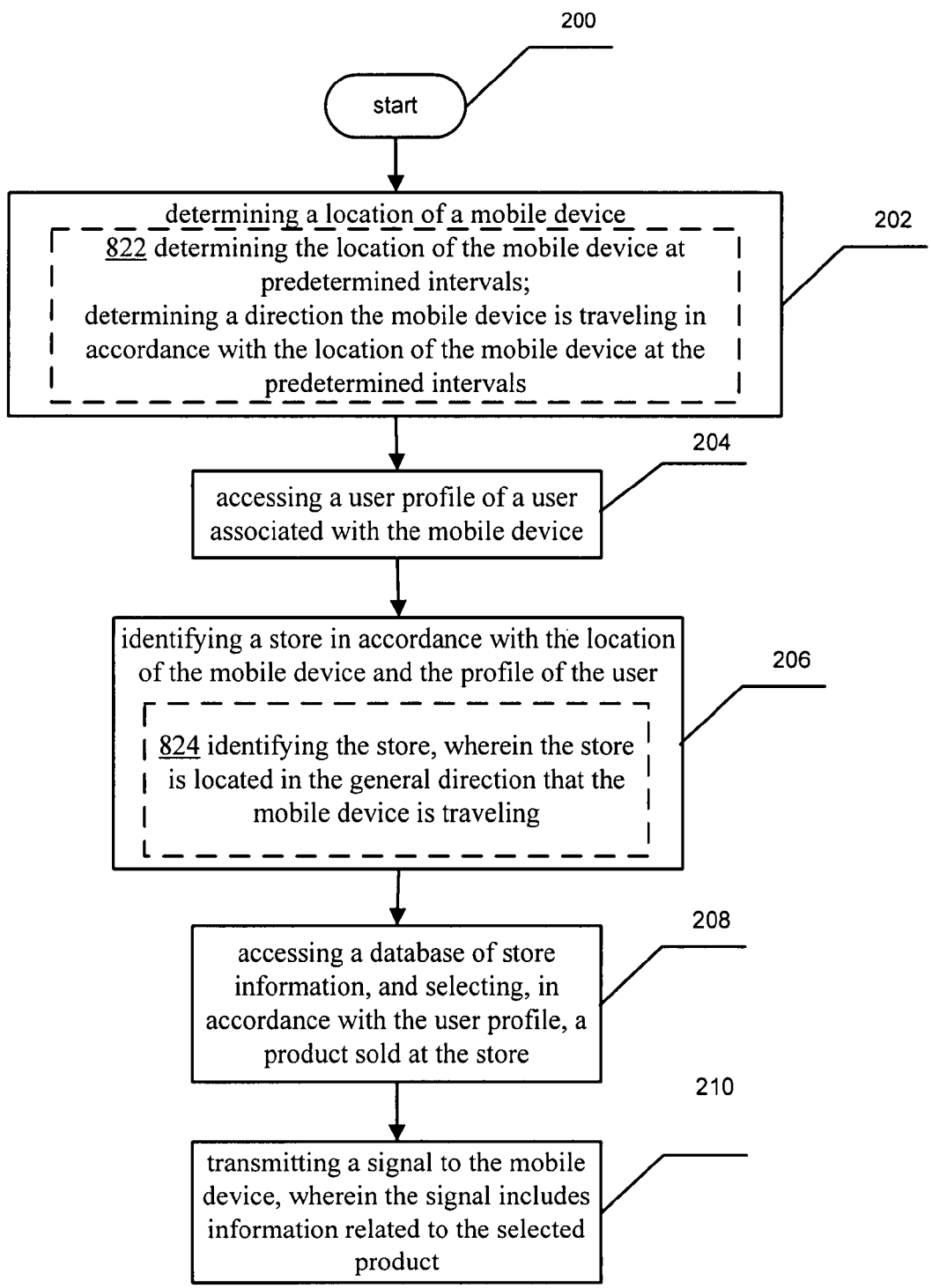
FIG. 8 illustrates an alternative embodiment of the operational flow 200 of FIG. 2.

Referring now to FIG. 8, it depicts an example embodiment of FIG. 2 that includes optional operation 822 and 824 that illustrate determining the location of the mobile device at predetermined intervals; determining a direction the mobile device is traveling in accordance with the location of the mobile device at the predetermined intervals; and identifying the store, wherein the store is located in the general direction that the mobile device is traveling. For example, in at least one embodiment, the direction that the user 101 is traveling may be used to identify stores of interest to the user 101. For example, since mobile devices 103 transmit location identification information at regular intervals, e.g., in some systems a mobile device 103 is "pinged" every couple minutes to determine where the device is, or if a mobile device 103 has an GPS-/A-GPS module, the location of the mobile device 103 can be continuously recorded, location information can be recorded, i.e., a user's path of travel may be plotted, and the direction the user 101 is going can be predicted. When the search module 111 searches for stores the user 101 may be interested in, it can take into account the direction the user 101 is traveling. For example, if the user 101 is traveling on a highway due east, the query may reflect this and stores 2 miles to the west of the user, for example, may not be listed, or the rank order of the store to the west of the user 101 may be lowered in any catalog generated.

Figure 9:
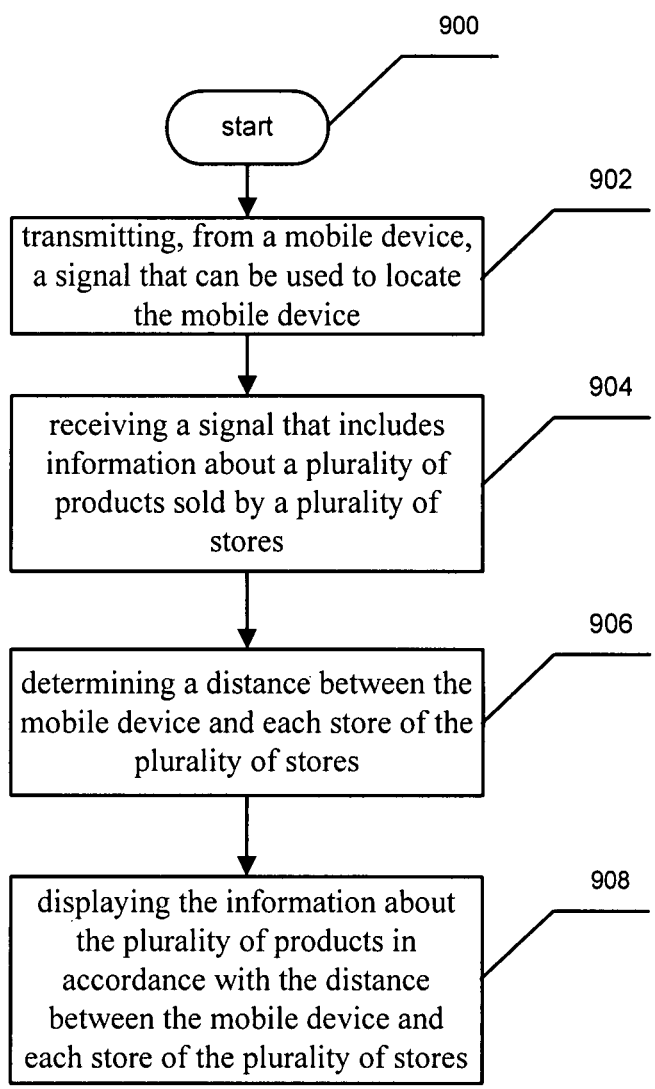
FIG. 9 exemplarily operational flow chart representing example operations related to receiving product catalogs.

Referring now to FIG. 9, it illustrates example techniques related to receiving a catalog. As illustrated by FIG. 9, operation 900 begins the operational procedure and operation 902 depicts transmitting, from a mobile device, a signal that can be used to locate the mobile device. For example, a mobile device 103 of a user 101 may transmit one or more signals indicative of identifying information to a service provider 110 via a base station 104, or in other embodiments, the mobile device 103 may include a radio frequency transceiver that enables it to transmit location information to a short range RF device, that can subsequently be routed through a network to the service provider 110. For example, in embodiments where the location information is transmitted to a service provider 110 via a base station 104, the mobile device 103 can transmit and receive data at predetermined intervals to allow the mobile switching center 106 to locate the device. The service provider 110 can accomplish by analyzing data such as the signal strength of the return message sent by the mobile device 103, the time difference between when a signal was sent from the tower and when the tower receives a response from the mobile device 103. In another example, the position of the mobile device 103 can be determined by using a technique that triangulates the position of the mobile device 103 by determining, at multiple towers, what direction signals from mobile device 103 were received from, and figuring out where the intersection between the towers is. In another example embodiment, the mobile device 103 may include a GPS or an A-GPS subsystem. In embodiments that include GPS, or A-GPS, a network of satellites may capture position data of the mobile device and pinpoint a user's location. In this example embodiment, the mobile device 103 may determine its own location based on the GPS or A-GPS subsystem.

Continuing with the description of FIG. 9, operation 904 depicts receiving a signal that includes information about a plurality of products sold by a plurality of stores. For example, in some embodiments of the present disclosure, a service provider 110 may transmit one or more packets of information to the mobile device 103. The packets of information can include information about multiple products sold by the different stores in the general area 120 of the mobile device 103. In some embodiments, the signal can be sent from the service provider 110 in response to a request from the mobile device 103. For example, the mobile device 103 can transmit one or more packets of information to the service provider 110 that identifies the general area 120 the mobile device is in 103, and in response, the service provider 110 can transmit information about products sold at the stores in the area 120. In other embodiments, the service provider 110 may determine where the mobile device 103 is based on location information and push packets of information indicative of products sold at stores to the mobile device 103.

Operation 906 of FIG. 9 depicts determining a distance between the mobile device and each store of the plurality of stores. For example, and in addition to the previous example, once the mobile device 103 obtains a list of products sold by stores in the general area 120, the mobile device 103 can determine the distance between the mobile device 103 and each store that sells the identified products. In this example, the information transmitted to the mobile device 103, may include the location of the stores such as the stores's address. In this example, the mobile device 103 may calculate the distance between it and each store and determine the distance between it and each store. In some embodiments, the mobile device 103 may detect its own location. For example, the mobile device 103 may include a GPS or A-GPS subsystem that enables the device to determine its position. In other embodiments, the service provider 110 may push one or more packets of information to the mobile device 103 that allows the mobile device to determine its location. In yet another embodiment, the mobile device 103 can determine its location based on what tower it is connected to, and its relationship to other towers in the area, e.g., signal strength and signal direction of the other towers.

Continuing with the example, operation 908 depicts displaying the information about the plurality of products in accordance with the distance between the mobile device and each store of the plurality of stores. For example, in some embodiments of the present disclosure, the mobile device 103 can display product information on a screen according to the stores they are sold at. The screen of the mobile device can be partitioned into multiple rows and columns, and the screen can be configured to allow a user 101 to scroll through the rows. In the present example, the mobile device 103 can use the distance between the mobile device 103 and the stores to determine the ordering of the stores. For example, in some embodiments the mobile device 103 will rank products sold at stores closer to the mobile device 103 before products sold at stores farther away. In this embodiment, if a user 101 activates a catalog feature of their mobile device 103, it will display products sold at a store, for example, 100 ft away, before products sold at a store 105 ft away.

Figure 10:
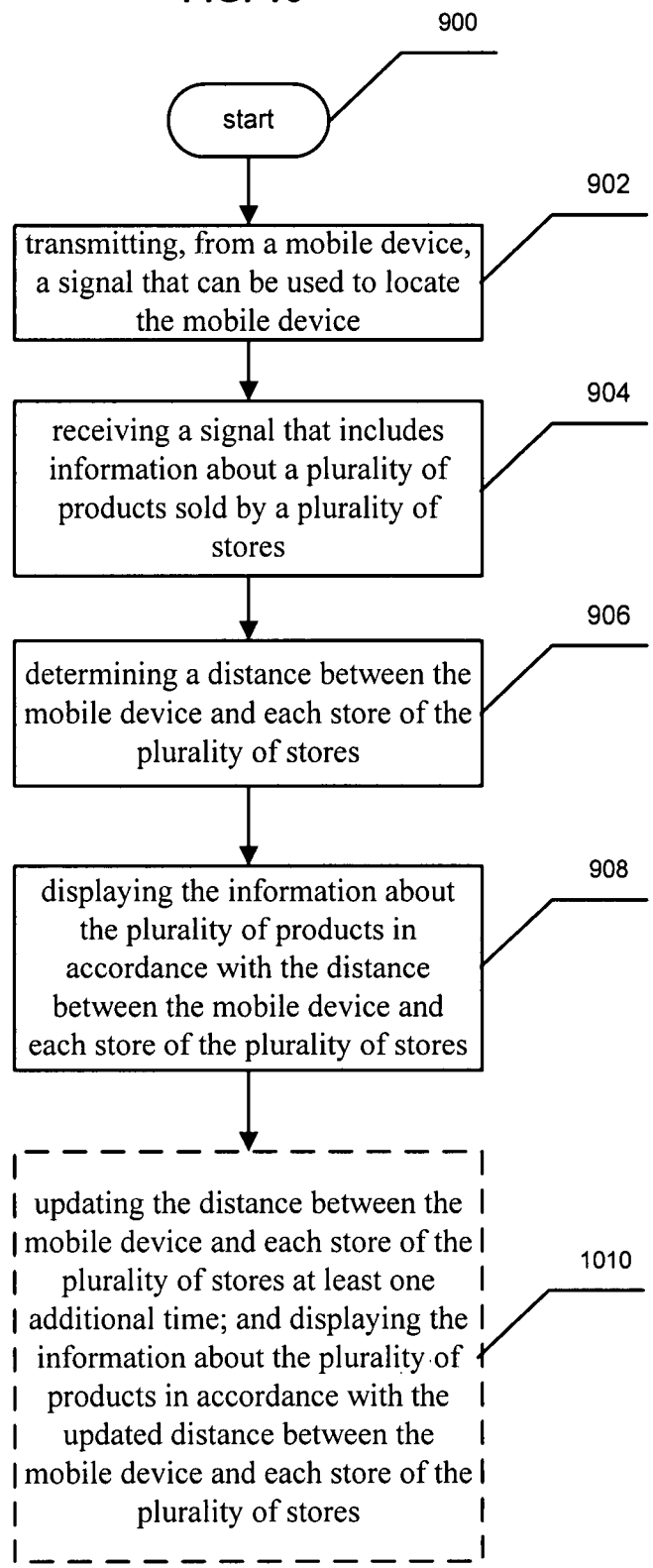
FIG. 10 illustrates an alternative embodiment of the operational flow 900 of FIG. 9.

Referring now to FIG. 10, it illustrates an alternative embodiment of the operational procedure 900 of FIG. 9 including the additional operation 1010 that depicts updating the distance between the mobile device and each store of the plurality of stores at least one additional time; and displaying the information about the plurality of products in accordance with the updated distance between the mobile device and each store of the plurality of stores. For example, in certain embodiments of the present disclosure, the mobile device 103, or the service provider 110 can update the position of the mobile device 103. In embodiments that include GPS or A-GPS, the location of the mobile device 103 can be updated almost instantaneously. In these embodiments, the displayed information about products may be refreshed, and the distance between stores can be recalculated. In other embodiments, the location of the mobile device 103 can be determined every couple minutes using cellular phone location techniques described above, or the service provider 110 may route packets of information to the mobile device 103 that enables the mobile device 103 to calculate its position. In yet other embodiments, the location of the mobile device 103 can be updated when the mobile device 103 comes within range of a RFID transceiver. In this instance, the user 101 of the mobile device 103 may move through a location with multiple RFID transmitters. In this example, every time a RFID transceiver detects the mobile device 103, a signal that indicates the device's location can be transmitted to the mobile 103 that indicates where the mobile device 103 is.

Figure 11:
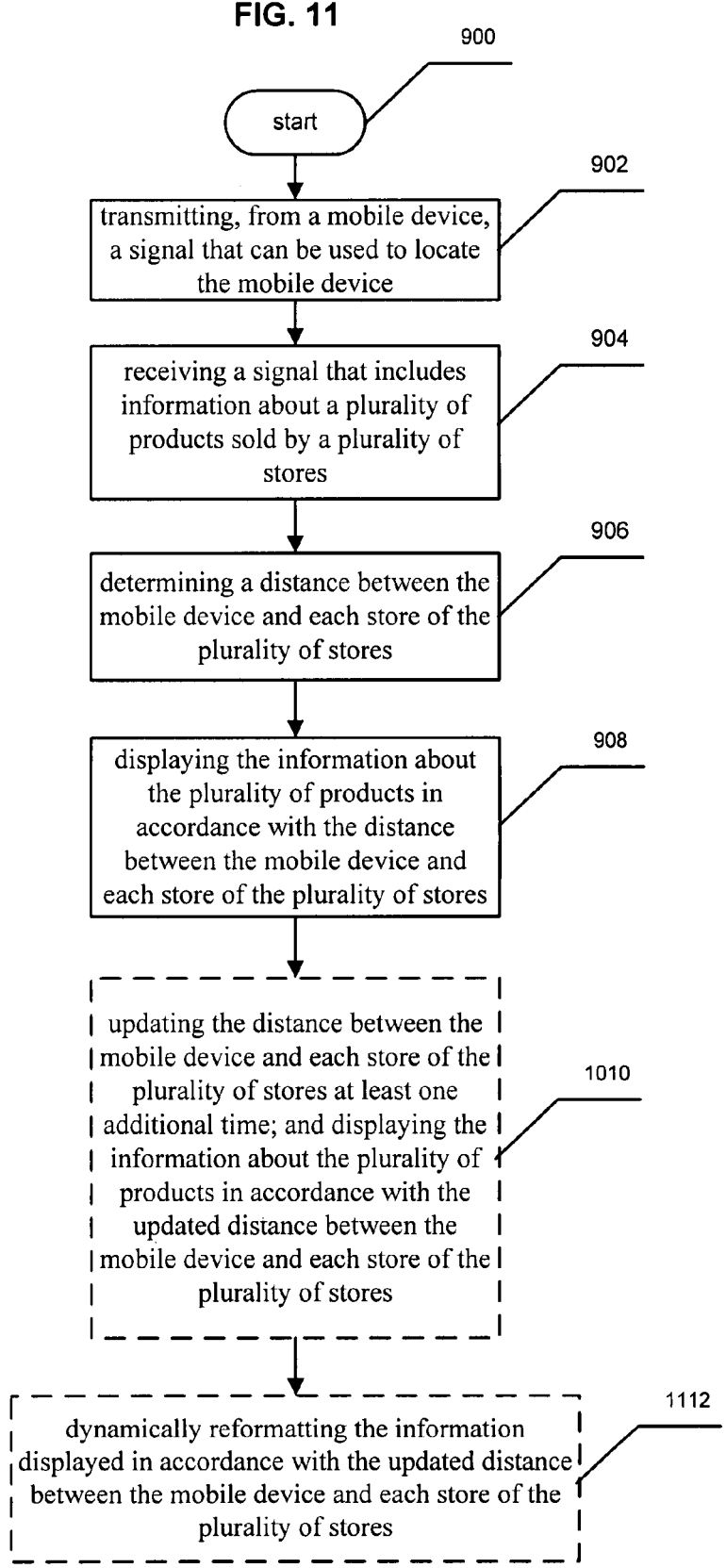
FIG. 11 illustrates an alternative embodiment of the operational flow 900 of FIG. 10.

Referring now to FIG. 11, it illustrates an alternative embodiment of the operational procedure 900 of FIG. 10 including the additional operation 1112 that shows dynamically reformatting the information displayed in accordance with the updated distance between the mobile device and each store of the plurality of stores. For example, in some embodiments of the present disclosure, the mobile device 103 can determine its location in real time, and the order that products are displayed can be changed in real time as the user 101 moves through an area such as area 120. For example, a user 101 can use the catalog feature of the present disclosure while they are standing in a mall, (area 120, in this example). The mobile device 103 may determine what stores are of interest to the user 101 and transmit product information to the mobile device 103. The information can be formatted and displayed in accordance with the distance between the mobile device 103, and the stores that sell the products as described above. In this example, as the user 101 moves through the mall, the distance between it and the stores will be calculated in real time and the ordering of the products may be continuously changed. Thus, as a user 101 moves through the mall, in this example, the products sold at stores the user 101 is closest too will be displayed first.

Figure 12:
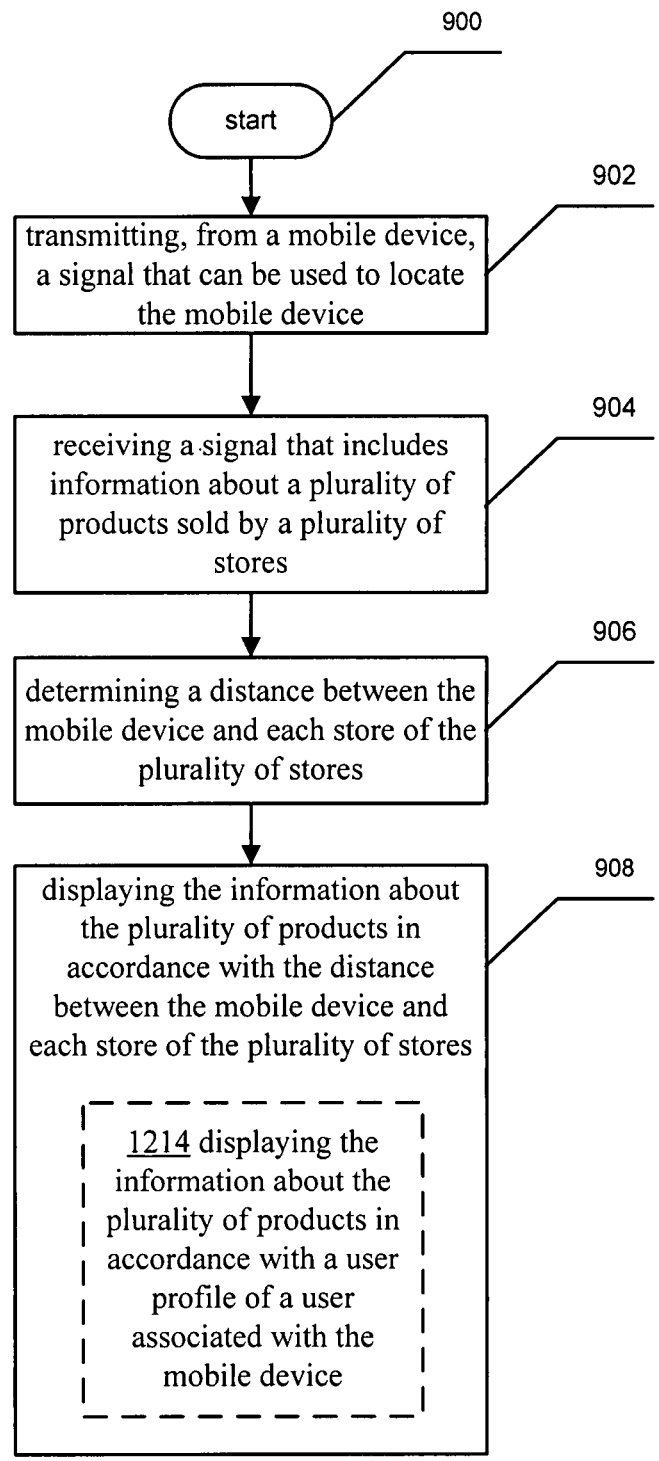
FIG. 12 illustrates an alternative embodiment of the operational flow 900 of FIG. 9.

Referring now to FIG. 12, it illustrates an alternative embodiment of the operational procedure 900 of FIG. 9 including the additional operation 1214 that depicts displaying the information about the plurality of products in accordance with a user profile of a user associated with the mobile device. For example, a search module 111 can be configured to identify one or more products that the user 101 may want based on the user's profile. In some embodiments, the database 112 may include information identifying the products that this particular store, i.e., the physical store in close proximity to the user 101, currently sells and has in stock.

In embodiments of the present disclosure, the search module 111 may select products using an algorithm that, for example, can identify new products for the user 101, and/or identify products that the user 101 has purchased, and/or identify products purchased by other users that purchased the same, or similar, products as the user 101, and/or eliminate products the user 101 has identified as products they are not interested in, or products that they already own. A specific example may include a search module 111 that uses location information provided by a location module 118 in conjunction with the user's profile to determine that a user 101 is interested in products sold by a Best Buy® (store 105-A for example). The search module 111 can query a database 112 (via the database management system 116) to determine the current inventory of the Best Buy® (105-A) located near the user 101. In this example, the user may have previously purchased a dvd player, and the search module 111 may retrieve a list of dvds, or dvd player accessories (because the user 101 has been identified as one that owns a dvd player and the dvd player is linked to other products like dvds and dvd player accessories). In this example, the list of dvds may include movies that include attributes similar to those purchased earlier by the user 101 i.e., if the user 101 purchased action movies, the search module 111 can be configured to search for action movies the user 101 does not own.

Figure 13:
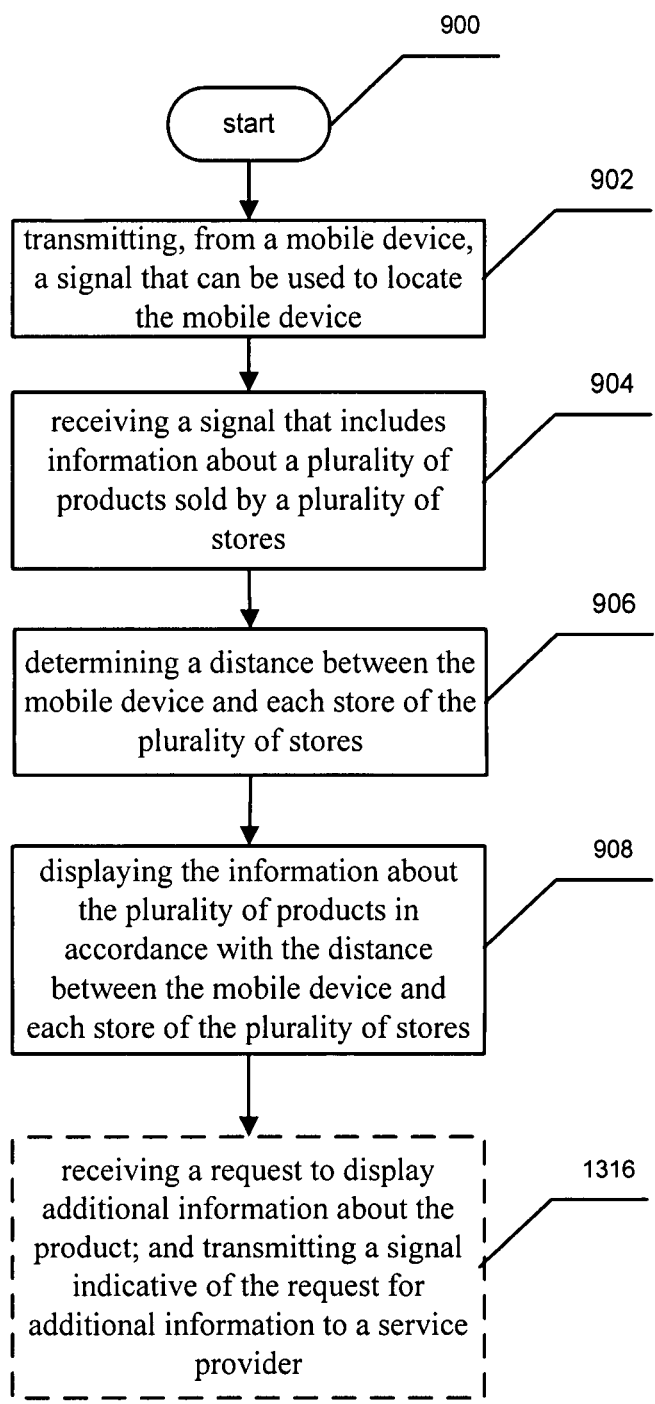
FIG. 13 illustrates an alternative embodiment of the operational flow 900 of FIG. 9.

Referring now to FIG. 13 it illustrates an alternative embodiment of the operational procedure 900 of FIG. 9 including the additional operation 1316 that depicts receiving a request to display additional information about the product; and transmitting a signal indicative of the request for additional information to a service provider. For example, in some embodiments of the present disclosure, if a user 101 selects a specific product, information indicative of the selection can be transmitted to the service provider 110. This allows the service provider 110 to record that this specific product is of interest to the user 101, and this information can be used to subsequently identify other products, or stores, that may be of interest. In this embodiment, and others, the user's mobile device 103 may include a RF transceiver such as a RFID transponder, and whenever the user 101 enters a store, a RFID detector can detect the user's entrance, and transmit that information to the service provider 110 via an IP network connection for example. In the situation where a user 101 is detected entering a store that sells the specific product that the user 101 recently viewed on their mobile device 103, the service provider 110 can determine that the user 101 is very interested in this product and use that information to identify other products, or services. In at least one other embodiment, the key strokes of the user 101 can be tracked, and if the user 101 views information about a particular product on their mobile device 103, it may transmit one or more packets of information to the service provider 110 indicative of the fact that the user 101 viewed information about the product. This information can be used to refine the user's profile and help identify other products or services.

Figure 14:
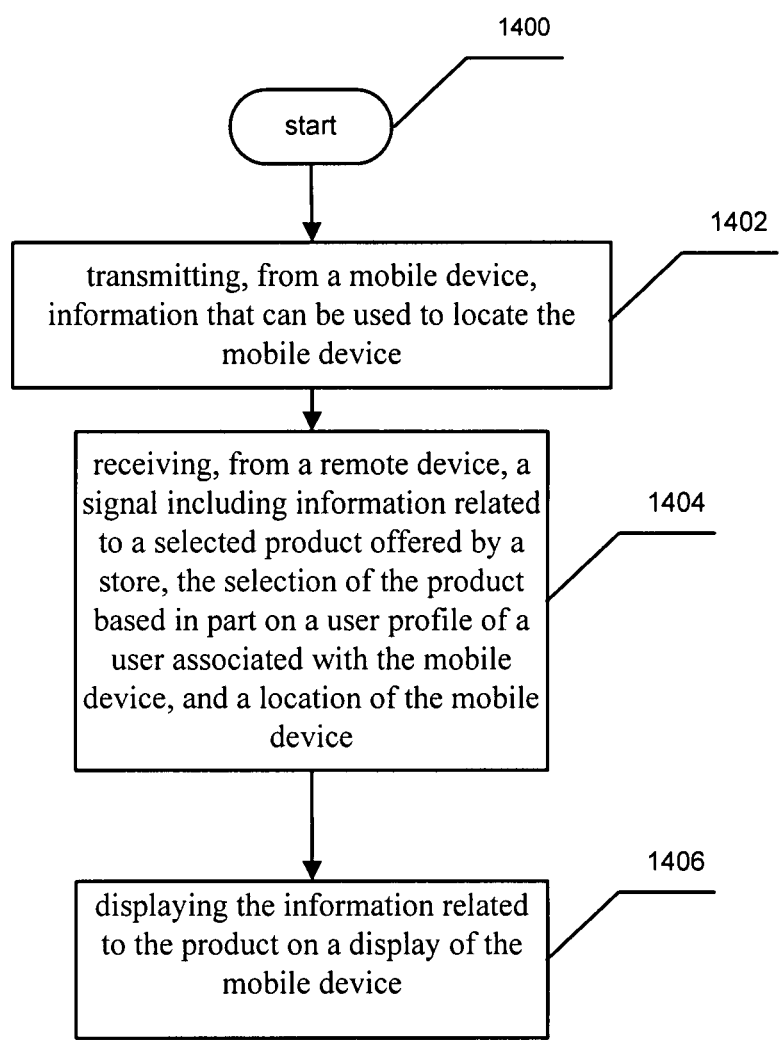
FIG. 14 exemplarily operational flow chart representing example operations related to receiving product catalogs.

Referring now to FIG. 14, it illustrates techniques related to receiving catalogs. Operation 1400 beings the operational process, and operation 1402 illustrates transmitting, from a mobile device, information that can be used to locate the mobile device. For example, a mobile device 103 of a user 101 may transmit one or more signals indicative of identifying information to a service provider 110 via a base station 104, or in other embodiments, the mobile device 103 may include a radio frequency transceiver that enables it to transmit location information to a short range RF device, that can subsequently be routed through a network to the service provider 110. For example, in embodiments where the location information is transmitted to a service provider 110 via a base station 104, the mobile device 103 can transmit and receive data at predetermined intervals to allow the mobile switching center 106 to locate the device. The service provider 110 can accomplish by analyzing data such as the signal strength of the return message sent by the mobile device 103, the time difference between when a signal was sent from the tower and when the tower receives a response from the mobile device 103. In another example, the position of the mobile device 103 can be determined by using a technique that triangulates the position of the mobile device 103 by determining, at multiple towers, what direction signals from mobile device 103 were received from, and figuring out where the intersection between the towers is. In another example embodiment, the mobile device 103 may include a GPS or an A-GPS subsystem. In embodiments that include GPS, or A-GPS, a network of satellites may capture position data of the mobile device and pinpoint a user's location. In this example embodiment, the mobile device 103 may determine its own location based on the GPS or A-GPS subsystem.

Operation 1404 of FIG. 14 illustrates receiving, from a remote device, a signal including information related to a selected product offered by a store, the selection of the product based in part on a user profile of a user associated with the mobile device, and a location of the mobile device. For example, in some embodiments of the present disclosure, a mobile device 103 can be configured to receive information generated by a service provider 110 using one or more of the example techniques described with respect to operations 204, 206, and/or 208 of FIG. 2.

Operation 1406, illustrates displaying the information related to the product on a display of the mobile device. For example, and in addition to the previous example, once information related to a product, or service, has been received, the mobile device 103 can display the information on a screen of the mobile device 103. The displayed product can, in some embodiments be included in a catalog of other products. In some example embodiments where the product is transmitted in a catalog, the catalog can be arranged into one or more columns and rows of information, the catalog can be configured to allow a user 101 to select one or more of the displayed columns or rows of information, and in response to user input, the mobile device 103 can display more information related to the selected column or row. A specific example may include a first screen depicting the names of stores listed alphabetically, or listed in order of distance from the user, i.e., a store 100 yards away from the user 101 is listed before a store 200 yards from the user 101. In this example, the user 101 may select a store, and in response a new screen of information can be rendered that includes, for example, rows of products, or services, the system has identified as products, or services, sold at the selected store. From this screen the user 101 can select one of the products and a new screen may be rendered that includes detailed information about the selected product such as, user reviews, user manuals, or any other information about the product.

Figure 15:
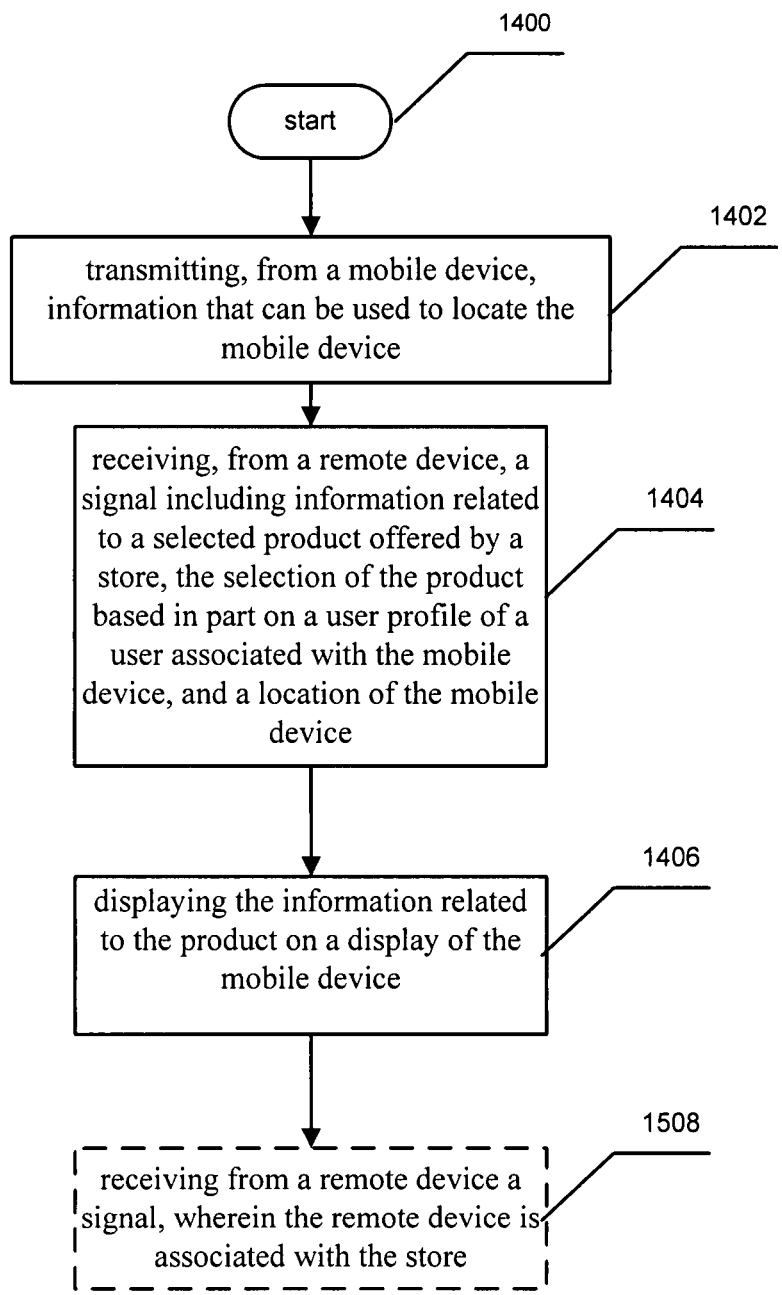
FIG. 15 illustrates an alternative embodiment of the operational flow 900 of FIG. 14.

Referring now to FIG. 15, it depicts an alternative embodiment of the operational flow 1400 of FIG. 14 including an additional operation 1508 that depicts receiving from a remote device a signal, wherein the remote device is associated with the store. In this example embodiment, the mobile device 103 can include a short wave radio transmitter such as an RFID module. In these embodiments the RFID subsystem can send signals to RFID transceiver located at a plurality of stores, e.g., places 105-A through 105-C that identifies the mobile device 103, and the store(s) can forward that information to the location module 118 via a network connection. For example, in some instances the mobile device 103 may have difficulty receiving cellular or GPS signals. In these, and other embodiments, the service provider 110 can be configured to determine the location of the mobile device 103 based on RFID transmitters that can be, for example, incorporated into security devices located at the entrance of stores, or placed throughout a store. In these example embodiments, when a user 101 walks within range of such a transmitter, the transmitter can send a signal to the RFID subsystem in the user's mobile device 103 and the device 103 can respond to the signal with identification information. Then, in some embodiments, the service provider 110 can transmit product information to the mobile device 103 via a packet based connection. In other embodiments, the service provider 110 may indicate to the store that the user 101 is near and the store itself can transmit a signal including product information related to the products it sells to the mobile device 103 based on the user's profile. The store can use a wireless connection such as Bluetooth® or 802.11, or a RFID transceiver to send product information to the mobile device 103.

Figure 16:
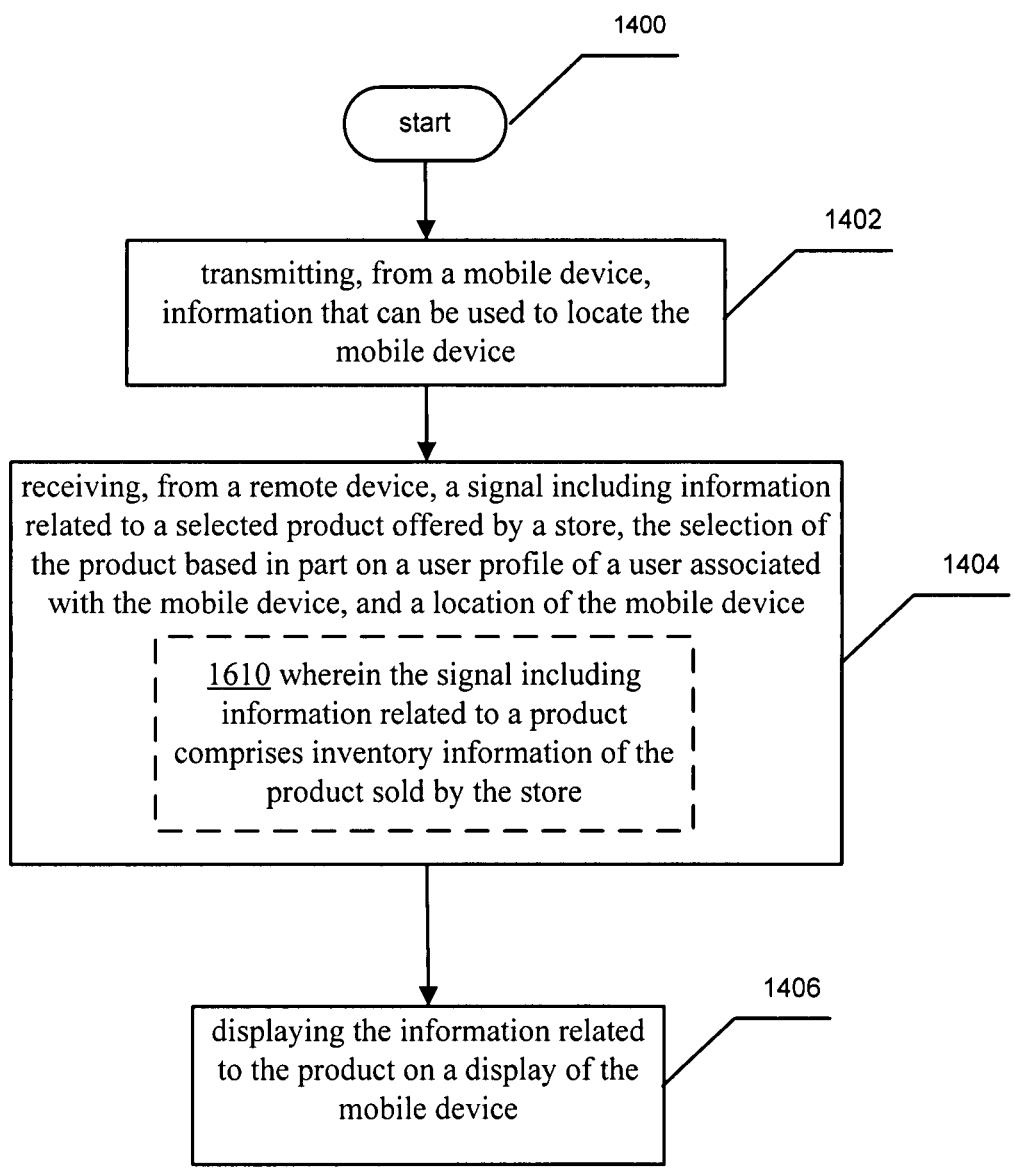
FIG. 16 illustrates an alternative embodiment of the operational flow 900 of FIG. 14.

As depicted by operation 1610 of FIG. 16, in some example embodiments of the operational procedure 1400 of FIG. 14, the signal including information related to the product can comprise inventory information of the product sold at the store the remote device can be associated with a service provider. For example, in at least one embodiment, the selection of products from a specific store to transmit in a catalog can be modified based on the inventory information for the store closest to the user 101. In some embodiments, the store may transmit inventory and product information related to the products to the service provider 110 at predetermined intervals such as once a day, once a week, or any other interval. In other embodiments of the present disclosure, the service provider 110 can include a web crawler program that is operable to access websites associated with stores and perform queries to determine what products are sold at what specific store locations, and whether the products are in stock, and/or the quantity. This information can be leveraged by the search module to add, remove, promote, demote, products, or services, based on whether they are in stock, based on the quantity of the product, or whether the service can be performed timely. For example, if the search module 111 identifies 3 stores of interest to the user 101, for example, a consumer electronics store, a clothing store, and a pizzeria, the search module 111 may compile a list of products, or services, that the stores offer, and remove products that are out of stock, promote products that are on sale, or promote products that have limited quantity within the catalog so that the user 101 is more likely to look at them. In this specific example, the pizzeria may be promoted based on whether there is a table available for the user 101, or the clothing store can be promoted if a shirt the user 101 wants is available, but in limited quantity.

Figure 17:
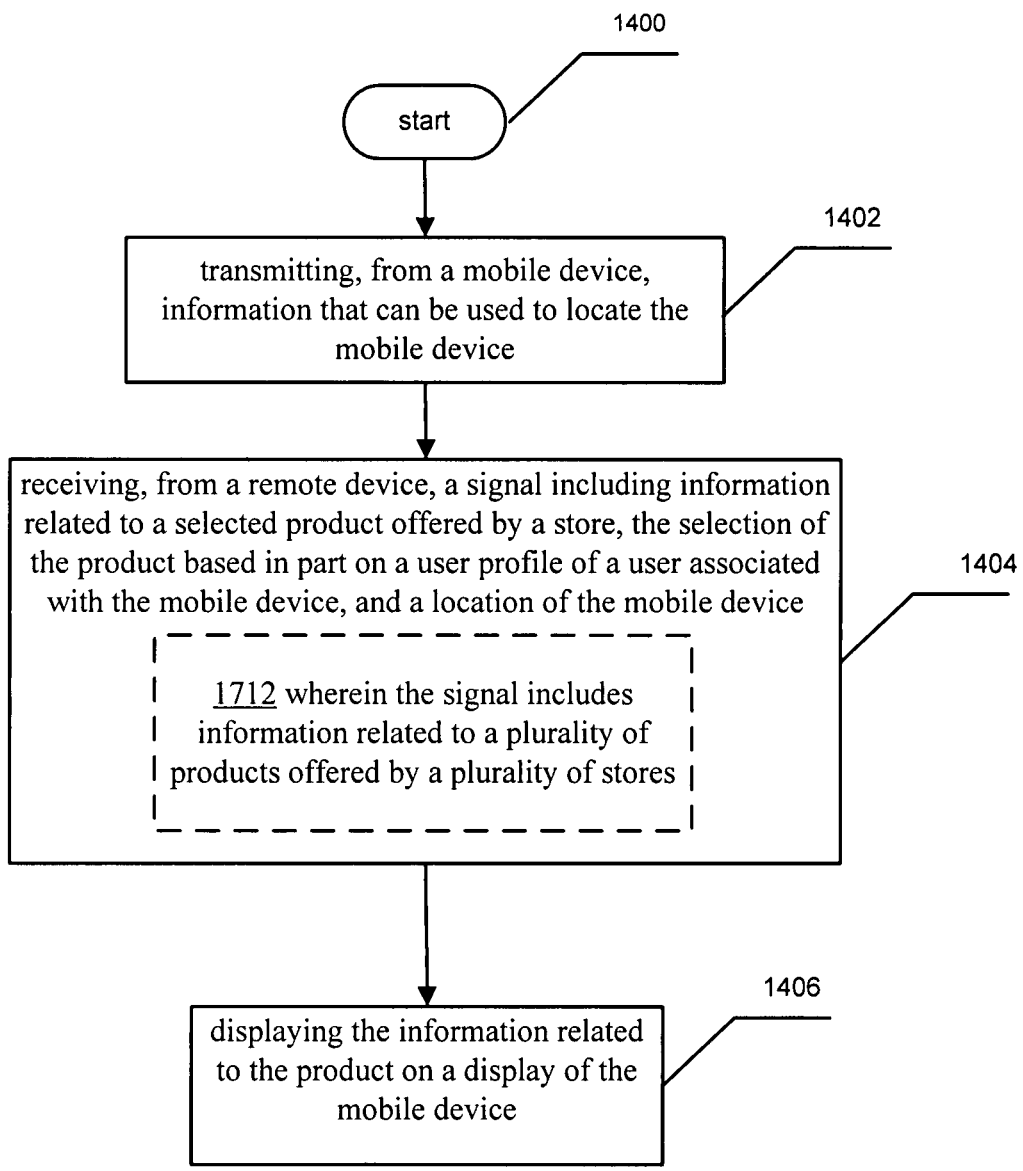
FIG. 17 illustrates an alternative embodiment of the operational flow 900 of FIG. 14.

Referring to FIG. 17, it depicts the additional operation 1712 that illustrates receiving a signal including information related to a product, wherein the signal includes information related to a plurality of products offered by a plurality of stores. For example, in some embodiments, the screen of the mobile device 103 can be configured to display one or more stores in the general area 120 of the user 101. For example, a user 101 can enter a geographical area 120, e.g., a mall, a strip mall, a shopping district, or any other place that has one or more businesses that offer products, or services, and they can execute a program on their mobile device 103 that enables them to receive a catalog of goods and/or services. In one embodiment, the query can determine whether there are sufficient products with similar attributes as the user 101 to enable the system to determine (at a high level of confidence) that the store would be of interest to the user 101. In another embodiment, instead of searching for attributes of products sold by the stores, the search module 111 can search the metadata associated with the stores to determine whether the store metadata is similar to the attributes associated with the user profile. For example, if a user with diverse interests executes the catalog feature of their mobile device, the search module 111 can be configured to identify a plurality of stores that sell products reflecting this diversity. For example, if the user 101 were in a mall, the screen can display a catalog with entries related to clothing stores, multiple consumer electronic stores, etc.

Figure 18:
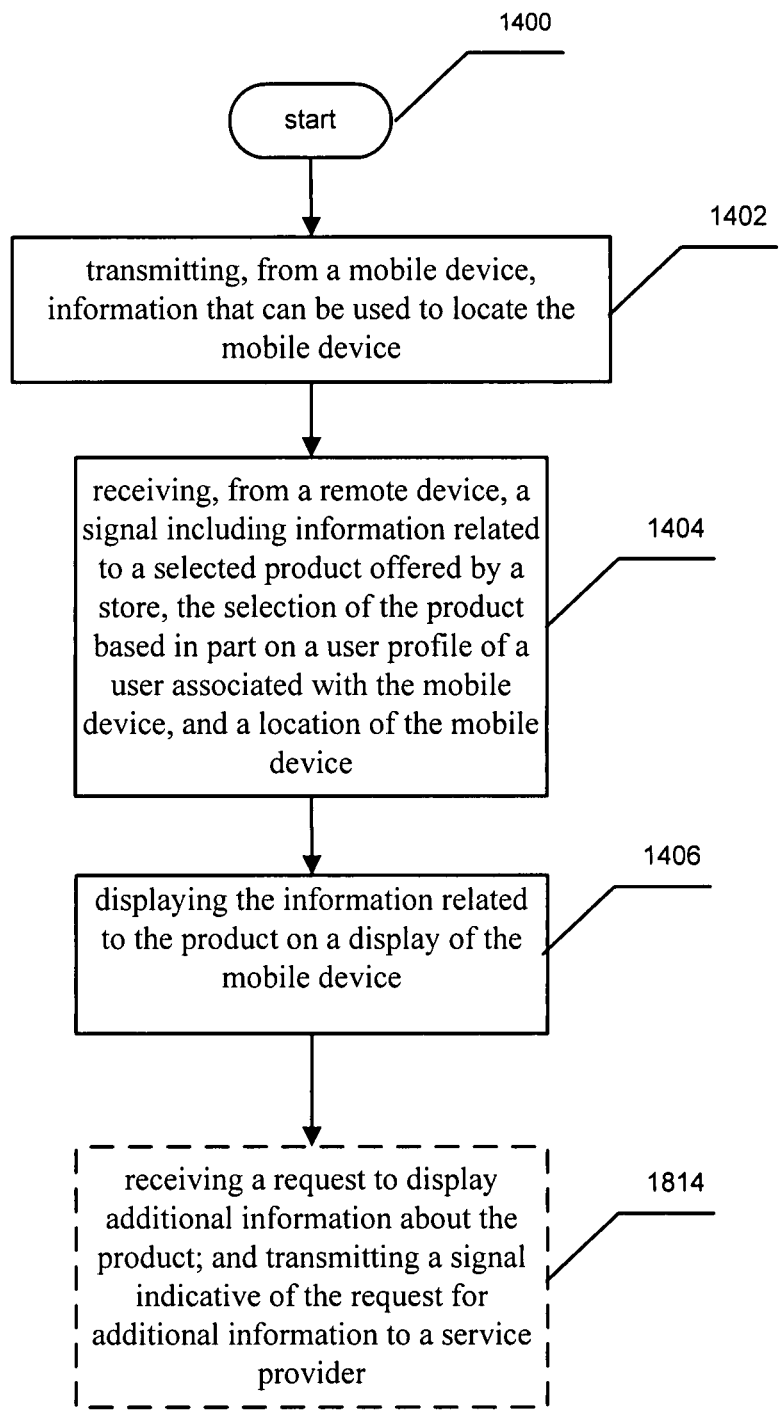
FIG. 18 illustrates an alternative embodiment of the operational flow 900 of FIG. 14.

Referring now to operation 1814 of FIG. 18, it depicts an example embodiment that includes the operation receiving a request to display additional information about the product; and transmitting a signal indicative of the request for additional information to a service provider. For example, in some embodiments of the present disclosure, if a user 101 selects a specific product, information indicative of the selection can be transmitted to the service provider 110. This allows the service provider 110 to record that this specific product is of interest to the user 101, and this information can be used to subsequently identify other products, or stores, that may be of interest. In this embodiment, and others, the user's mobile device 103 may include a RF transceiver such as a RFID transponder, and whenever the user 101 enters a store, a RFID detector can detect the user's entrance, and transmit that information to the service provider 110 via an IP network connection for example. In the situation where a user 101 is detected entering a store that sells the specific product that the user 101 recently viewed on their mobile device 103, the service provider 110 can determine that the user 101 is very interested in this product and use that information to identify other products, or services. In at least one other embodiment, the key strokes of the user 101 can be tracked, and if the user 101 views information about a particular product on their mobile device 103, it may transmit one or more packets of information to the service provider 110 indicative of the fact that the user 101 viewed information about the product. This information can be used to refine the user's profile and help identify other products or services.

Figure 19:
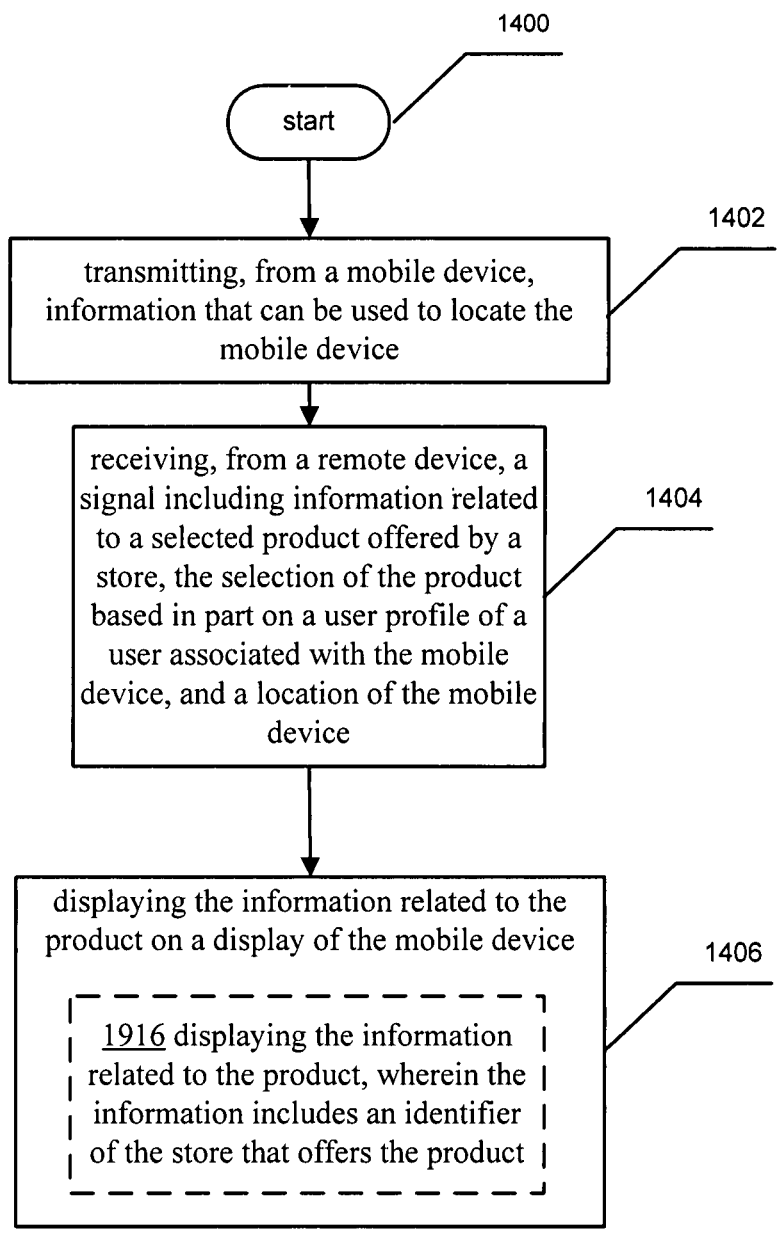
FIG. 19 illustrates an alternative embodiment of the operational flow 900 of FIG. 14.

Referring now to FIG. 19, it depicts an alternative embodiment of the operational flow 1400 of FIG. 14 that includes the additional operation 1916 that depicts displaying the information related to the product, wherein the information includes an identifier of the store that offers the product. For example, in some example embodiments, the product can be displayed on the screen of the mobile device 103, and an indicator identifying the store that sells the product can be listed. In this embodiment, a user 101 can be provided with information identifying what store actually sells the product that they are interested in.

Figure 20:
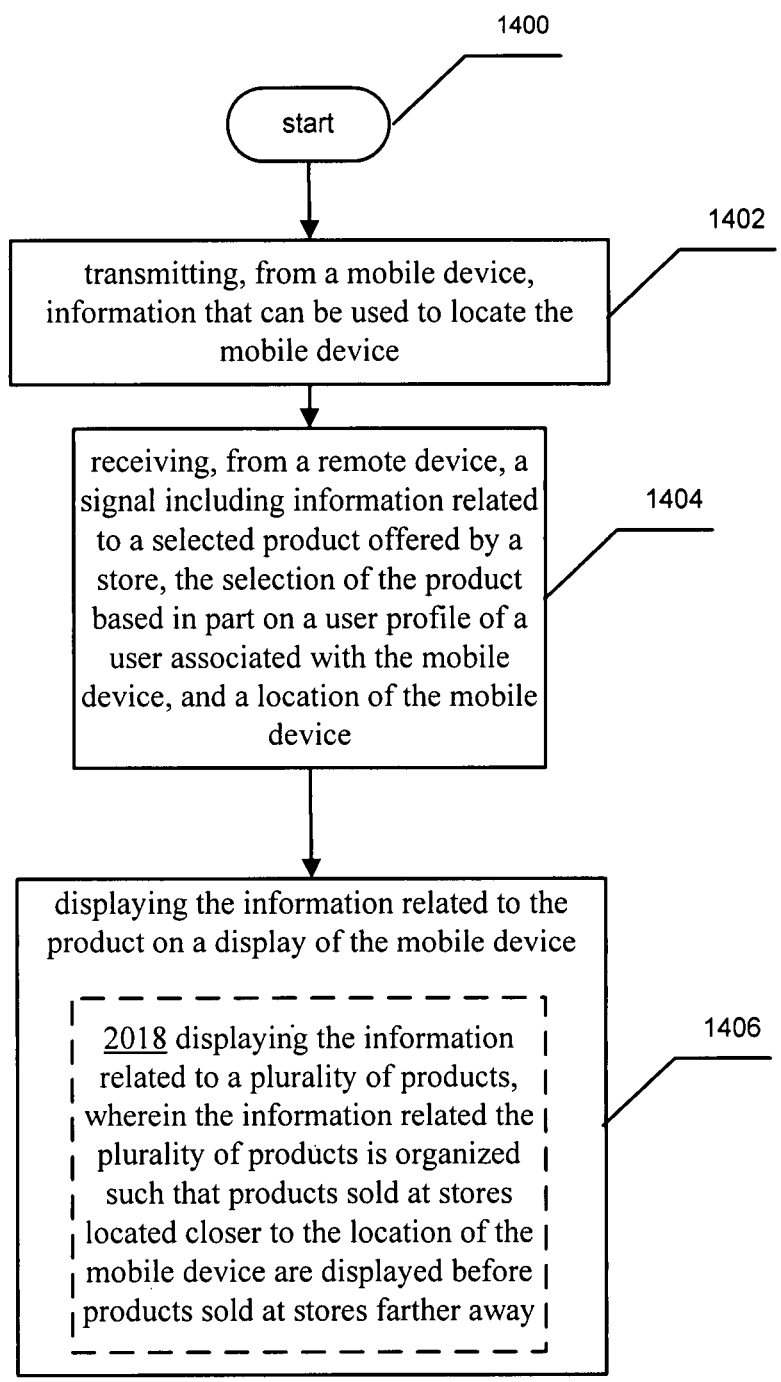
FIG. 20 illustrates an alternative embodiment of the operational flow 900 of FIG. 14.

Referring now to FIG. 20, it depicts an alternative embodiment of the operational flow 1400 of FIG. 14 that includes operation 2018 that shows displaying the information related to a plurality of products, wherein the information related the plurality of products is organized such that products sold at stores located closer to the location of the mobile device are displayed before products sold at stores farther away. For example, in at least one embodiment the location of the mobile device 103 can be determined and multiple products sold by different stores can be transmitted to the mobile device 103. In this example, the mobile device 103 can be configured to organize the products such that products sold at stores close to the user 101, are presented before products sold at stores farther away. A specific example of this can include a user 101 standing 100 ft. from place 105-A and 300 ft. from place 105-C. In the instance that products sold by both stores are identified by the system, the products sold at place 105-A can be listed before those at 105-C. In some example embodiments, the location of the mobile device 103 can be updated continuously, and the order of products may dynamically change if the user 101 is moving. For example, the user 101 may have their mobile device 103 open while they are walking through a mall. As the user 101 moves past stores, the contents of the catalog may be rearranged based on what store the user 101 is closest to at the particular moment.

Figure 21:
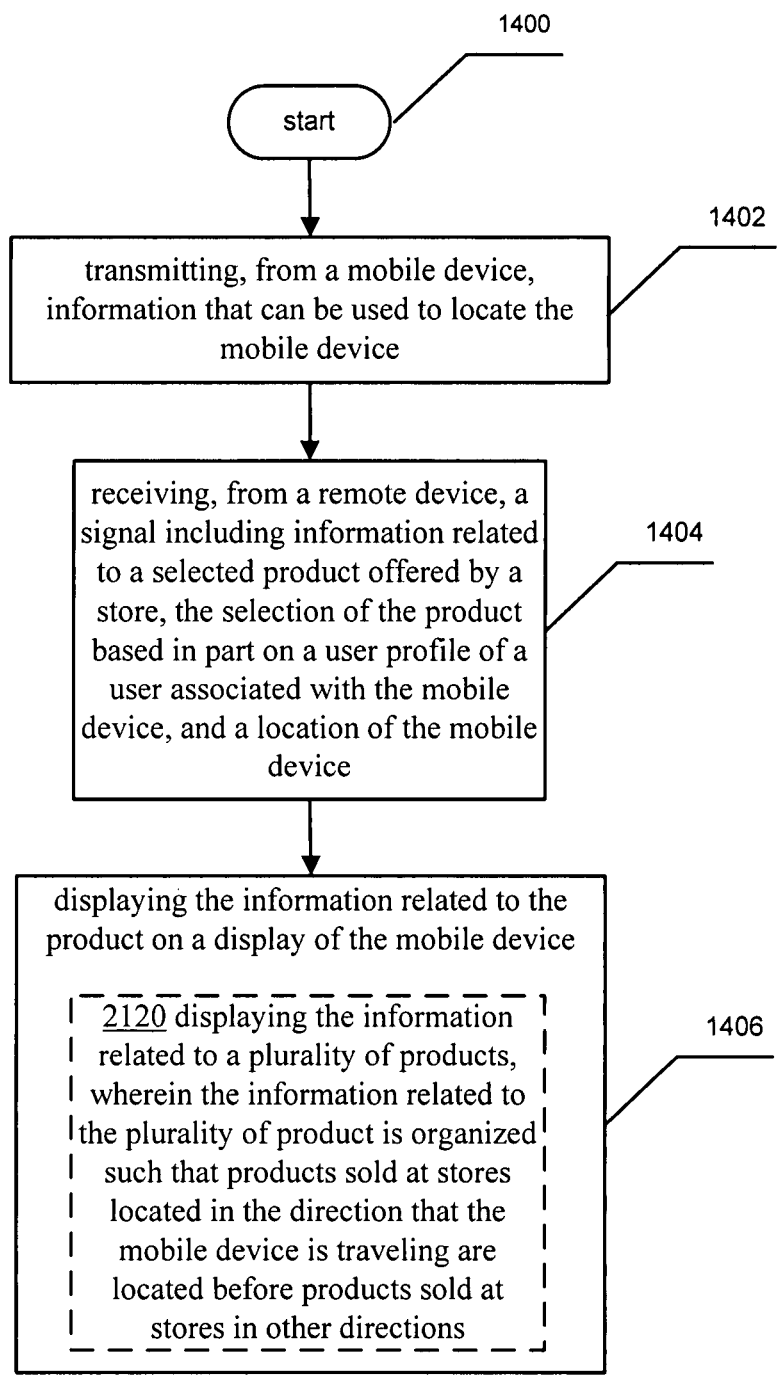
FIG. 21 illustrates an alternative embodiment of the operational flow 900 of FIG. 14.

Referring now to FIG. 21, it depicts an alternative embodiment of the operational flow 1400 of FIG. 14 that includes operation 2120 that shows displaying the information related to a plurality of products, wherein the information related to the plurality of products is organized such that products sold at stores located in the direction that the mobile device is traveling are located before products sold at stores in other directions. For example, in at least one embodiment, the direction that the user 101 is traveling may be used to identify stores. For example, since mobile devices 103 transmit location identification information at regular intervals, e.g., in some systems a mobile device 103 is "pinged" every couple minutes to determine where the device is, or if a mobile device 103 has a GPS/A-GPS module, the location of the mobile device 103 can be continuously recorded, a user's path of travel may be plotted, and the direction the user 101 is going can be predicted. When the search module 111 searches for stores, it can take into account the direction the user 101 is traveling. For example, if the user 101 is traveling on a highway due east, the query may reflect this and stores 2 miles to the west of the user, for example, may not be listed, or the rank order of the store may be lowered in any catalog generated.

Those having skill in the art will recognize that the state of the art has progressed to the point where there is little distinction left between hardware and software implementations in a system. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Thus, there are many different ways to implement aspects of the present disclosure and none of the different ways are inherently superior to the other.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

What is claimed is:

1. A method comprising:
   determining, by a processor, a location of a mobile device;
   determining, by the processor, a product purchased by a user associated with the mobile device;
   determining, by the processor, products of interest based at least in part on the product purchased by the user;
   identifying, by the processor, based at least in part on the location of the mobile device, at least one store that sells the products of interest;
   generating, by the processor, a catalog comprising the products of interest sold at the at least one store, wherein the products of interest in the catalog are grouped according to the at least one store that sells a respective product of the products of interest in the catalog;
   determining, by the processor for each store of the at least one store, an inventory of a first product of the products of interest in the catalog;
   determining, by the processor, based on the inventory of the first product of the products of interest in the catalog, that the first product of the products of interest in the catalog has a limited quantity;
   generating, by the processor based on determining that the first product of the products of interest in the catalog has the limited quantity, a modified catalog comprising the first product of the products of interest promoted over a second product of the products of interest; and providing, by the processor to the mobile device, the modified catalog for display.

2. The method of claim 1, further comprising receiving information related to a plurality of products sold at a plurality of stores in proximity to the location of the mobile device, wherein the plurality of stores comprises the at least one store.

3. The method of claim 1, further comprising receiving an indication that a product of interest of the products of interest was purchased at the at least one store.

4. The method of claim 1, further comprising:
determining that the mobile device displayed information related to a specific product; and
updating the modified catalog to include the specific product.

5. The method of claim 1, further comprising:
associating the products of interests with similar products of interest of other users; and
updating the modified catalog to include the similar products of interest.

6. The method of claim 1, further comprising:
determining a direction the mobile device is traveling; and
identifying a store of the at least one store that is located in the direction that the mobile device is traveling.

7. The method of claim 1, further comprising:
receiving a request for additional information about the first product of the products of interest in the modified catalog; and
providing, to the mobile device for display on the mobile device, the additional information.

8. The method of claim 1, further comprising:
updating the location of the mobile device to an updated location; and
updating, based on the updated location, the modified catalog.

9. A system comprising:
a processor; and
a memory storing executable instructions that, when executed by the processor, cause the processor to perform operations comprising:
determining a location of a mobile device,
determining a product purchased by a user associated with the mobile device,
determining products of interest based at least in part on the product purchased by the user,
identifying, based at least in part on the location of the mobile device, at least one store that sells the products of interest,
generating a catalog comprising the products of interest sold at the at least one store, wherein the products of interest in the catalog are grouped according to the at least one store that sells a respective product of the products of interest in the catalog,
determining, for each store of the at least one store, an inventory of a first product of the products of interest in the catalog,
determining, based on the inventory of the first product of the products of interest in the catalog, that the first product of the products of interest in the catalog has a limited quantity,
generating, based on determining that the first product of the products of interest in the catalog has the limited quantity, a modified catalog comprising the first product of the products of interest promoted over a second product of the products of interest, and
providing, to the mobile device, the modified catalog for display.

10. The system of claim 9, wherein the operations further comprise receiving information related to a plurality of products sold at a plurality of stores in proximity to the location of the mobile device, wherein the plurality of stores comprises the at least one store.

11. The system of claim 9, wherein the operations further comprise receiving an indication that a product of interest of the products of interest was purchased at the at least one store.

12. The system of claim 9, wherein the operations further comprise:
determining that the mobile device displayed information related to a specific product; and
updating the modified catalog to include the specific product.

13. The system of claim 9, wherein the operations further comprise
associating the products of interests with similar products of interest of other users; and
updating the modified catalog to include the similar products of interest.

14. The system of claim 9, wherein the operations further comprise:
determining a direction the mobile device is traveling; and
identifying a store of the at least one store that is located in the direction that the mobile device is traveling.

15. The system of claim 9, wherein the operations further comprise
receiving a request for additional information about the first product of the products of interest in the modified catalog; and
providing, to the mobile device for display on the mobile device, the additional information.

16. The system of claim 9, wherein the operations further comprise:
updating the location of the mobile device to an updated location; and
updating, based on the updated location, the modified catalog.

17. A memory comprising executable instructions that, when executed by a processor, cause the processor to perform operations comprising:
determining a location of a mobile device;
determining a product purchased by a user associated with the mobile device;
determining products of interest based at least in part on the product purchased by the user;
identifying, based at least in part on the location of the mobile device, at least one store that sells the products of interest;
generating a catalog comprising the products of interest sold at the at least one store, wherein the products of interest in the catalog are grouped according to the at least one store that sells a respective product of the products of interest in the catalog;
determining, for each store of the at least one store, an inventory of a first product of the products of interest in the catalog,
determining, based on the inventory of the first product of the products of interest in the catalog, that the first product of the products of interest in the catalog has a limited quantity,
generating, based on determining that the first product of the products of interest in the catalog has the limited quantity, a modified catalog comprising the first product of the products of interest promoted over a second product of the products of interest; and providing, to the mobile device, the modified catalog for display.

18. The memory of claim 17, wherein the operations further comprise:
  determining that the mobile device displayed information related to a specific product; and
  updating the modified catalog to include the specific product.

19. The memory of claim 17, wherein the operations further comprise
  associating the products of interests with similar products of interest of other users; and
  updating the modified catalog to include the similar products of interest.

20. The memory of claim 17, wherein the operations further comprise:
  determining a direction the mobile device is traveling; and
  identifying a store of the at least one store that is located in the direction that the mobile device is traveling.

* * * * *